United States Patent
Inagaki et al.

(10) Patent No.: US 12,140,353 B2
(45) Date of Patent: Nov. 12, 2024

(54) REFRIGERATION CYCLE DEVICE

(71) Applicant: DENSO CORPORATION, Kariya (JP)

(72) Inventors: Kouji Inagaki, Kariya (JP); Daiki Katou, Kariya (JP); Hiroaki Kawano, Kariya (JP); Yoshiki Katoh, Kariya (JP); Naoya Makimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 322 days.

(21) Appl. No.: 17/576,030

(22) Filed: Jan. 14, 2022

(65) Prior Publication Data

US 2022/0136747 A1    May 5, 2022

Related U.S. Application Data

(63) Continuation of application No. PCT/JP2020/026293, filed on Jul. 3, 2020.

(30) Foreign Application Priority Data

Jul. 22, 2019    (JP) .................................. 2019-134785

(51) Int. Cl.
    *F25B 41/31*    (2021.01)
    *F25B 5/02*    (2006.01)

(52) U.S. Cl.
    CPC ............... *F25B 41/31* (2021.01); *F25B 5/02* (2013.01)

(58) Field of Classification Search
    CPC .................................. F25B 41/31; F25B 5/02
    USPC ......................................................... 62/160
    See application file for complete search history.

(56) References Cited

U.S. PATENT DOCUMENTS

| | | | |
|---|---|---|---|
| 2,548,403 A * | 4/1951 | Smith | ................. F26B 9/06 34/232 |
| 11,629,891 B2 * | 4/2023 | Saito | ................. F25B 47/006 62/160 |
| 2002/0129612 A1 | 9/2002 | Saikusa et al. | |

(Continued)

FOREIGN PATENT DOCUMENTS

| | | |
|---|---|---|
| JP | 3671850 B2 | 7/2005 |
| JP | 2010-042698 A | 2/2010 |

(Continued)

*Primary Examiner* — Raheena R Malik
(74) *Attorney, Agent, or Firm* — Harness, Dickey & Pierce, P.L.C.

(57) ABSTRACT

A refrigeration cycle device includes a compressor configured to compress and discharge a refrigerant containing oil, a refrigerant radiator configured to heat the ventilation air using the refrigerant discharged from the compressor as a heat source during a room interior heating, a refrigerant decompression unit configured to decompress the refrigerant having passed through the refrigerant radiator, an evaporator configured to evaporate the refrigerant and to function as a heat absorber during the room interior heating; and a controller configured to control the refrigerant decompression unit and to perform a fluctuation operation at least during the room interior heating. In the fluctuation operation, a throttle opening degree of the refrigerant decompression unit is changed such that a refrigerant state on a refrigerant outlet side of the evaporator is alternately changed to a superheated state having a superheat degree and a wet state containing the wet vapor.

16 Claims, 9 Drawing Sheets

(56) References Cited

U.S. PATENT DOCUMENTS

| | | | | |
|---|---|---|---|---|
| 2006/0137388 A1* | 6/2006 | Kakehashi | ................ | F25B 5/02 |
| | | | | 62/524 |
| 2008/0314071 A1* | 12/2008 | Ohta | ........................ | F25B 5/04 |
| | | | | 62/498 |
| 2009/0013700 A1* | 1/2009 | Unezaki | .................. | F25B 13/00 |
| | | | | 62/77 |
| 2013/0000339 A1 | 1/2013 | Shimazu et al. | | |

FOREIGN PATENT DOCUMENTS

| | | | |
|---|---|---|---|
| JP | 5709844 B2 | 4/2015 | |
| JP | 2019-066049 A | 4/2019 | |

\* cited by examiner

FIG. 2

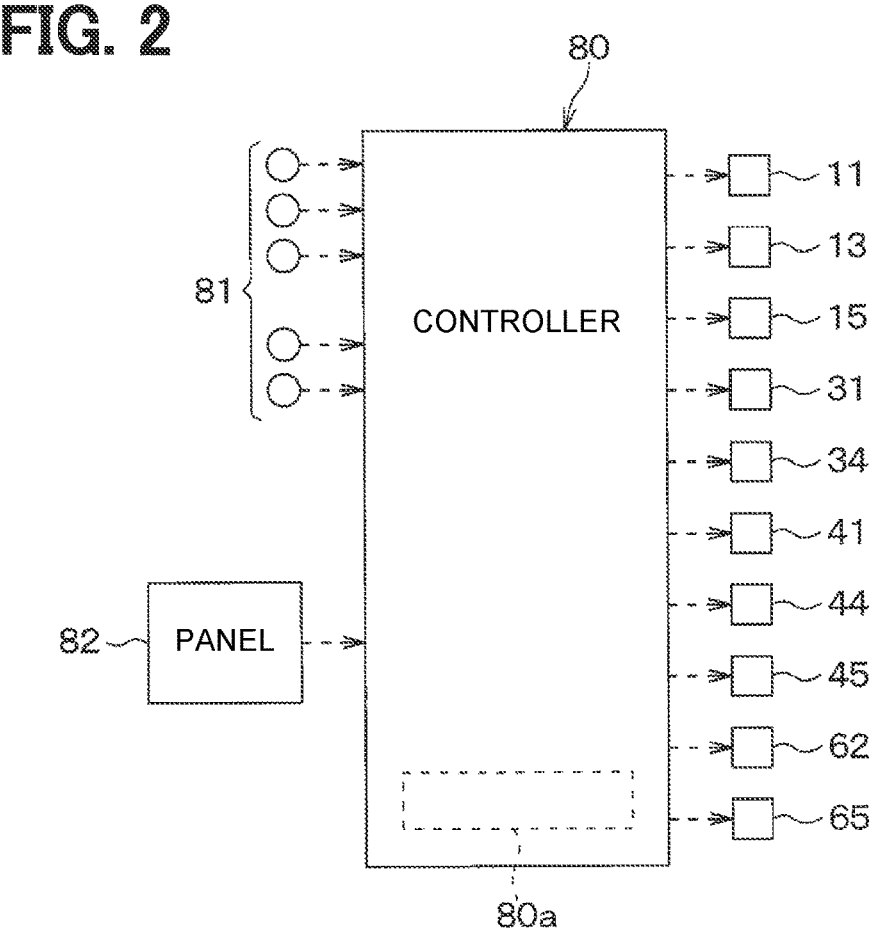

FIG. 3

|  | ROOM INTERIOR COOLING | DEVICE COOLING | ROOM INTERIOR HEATING |
|---|---|---|---|
| FIRST ON-OFF VALVE | FULLY CLOSED | FULLY OPENED | FULLY OPENED |
| FIRST EXPANSION VALVE | - | VARIABLE THROTTLE STATE SUPERHEATING PROCESSING | VARIABLE THROTTLE STATE FLUCTUATION PROCESSING |
| SECOND ON-OFF VALVE | FULLY OPENED | FULLY CLOSED | FULLY CLOSED |
| SECOND EXPANSION VALVE | VARIABLE THROTTLE STATE SUPERHEATING PROCESSING | - | - |

FIG. 10

|  | DEVICE COOLING | ROOM INTERIOR HEATING |
|---|---|---|
| DECOMPRESSION UNIT | VARIABLE THROTTLE STATE SUPERHEATING PROCESSING | VARIABLE THROTTLE STATE FLUCTUATION PROCESSING |

REFRIGERATION CYCLE DEVICE

CROSS REFERENCE TO RELATED APPLICATION

The present application is a continuation application of International Patent Application No. PCT/JP2020/026293 filed on Jul. 3, 2020, which designated the U.S. and claims the benefit of priority from Japanese Patent Application No. 2019-134785 filed on Jul. 22, 2019. The entire disclosures of all of the above applications are incorporated herein by reference.

TECHNICAL FIELD

The present disclosure relates to a refrigeration cycle device that can perform a room interior heating in which ventilation air to be blown into a space to be air conditioned is heated.

BACKGROUND

A conventional vapor-compression refrigeration cycle device has been known which heats ventilation air to be blown into a vehicle interior by exchanging heat between a refrigerant discharged from a compressor and the ventilation air. In a refrigeration cycle device of this type, oil for lubricating a compressor is generally mixed into a refrigerant, and the refrigerant containing the oil is circulated in the cycle.

SUMMARY

A refrigeration cycle device of the present disclosure is capable of performing a room interior heating in which ventilation air to be blown into a space to be air conditioned is heated. In this case, a controller may be configured to perform, at least during the room interior heating, a fluctuation operation in which a throttle opening degree of a refrigerant decompression unit is changed and a refrigerant state on a refrigerant outlet side of an evaporator is alternately changed to a superheated state having a superheat degree and a wet state containing wet vapor.

Alternatively, a refrigeration cycle device is capable of performing a room interior heating in which ventilation air to be blown into a space to be air conditioned is heated, a device cooling in which a heat generating device is cooled, and a room interior cooling in which the ventilation air is cooled. In the refrigeration cycle device, a controller may be configured to perform, at least during the room interior heating, a fluctuation operation in which a throttle opening degree of a refrigerant decompression unit is changed and a refrigerant state on a refrigerant outlet side of a device cooler is alternately changed to a superheated state having a superheat degree and a wet state containing wet vapor.

BRIEF DESCRIPTION OF THE DRAWINGS

The above and other objects, features and advantages of the present disclosure will become more apparent from the following detailed description made with reference to the accompanying drawings.

FIG. 2 is a block diagram schematically illustrating a controller of the refrigeration cycle device.

FIG. 3 is a diagram illustrating control modes in respective decompression units for each operation mode in the refrigeration cycle device according to the first embodiment.

FIG. 10 is a diagram illustrating control modes in respective decompression units for each operation mode in the refrigeration cycle device according to the third embodiment.

DESCRIPTION OF EMBODIMENTS

Figure 1:
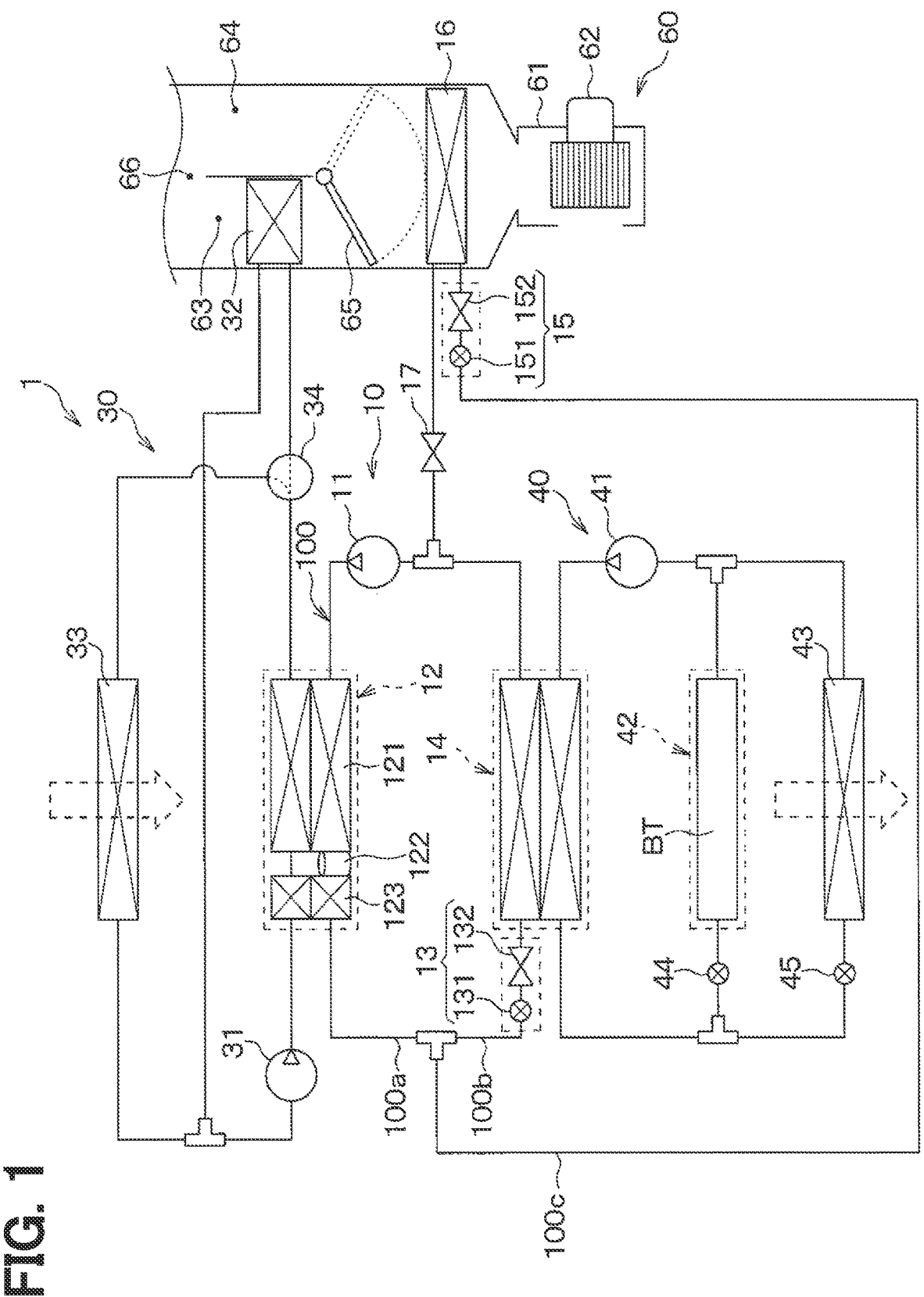
FIG. 1 is a diagram illustrating a schematic configuration of an air conditioner including a refrigeration cycle device according to a first embodiment.

In a refrigeration cycle device, for example, when a temperature of outside air becomes extremely low during a room interior heating (e.g., vehicle interior heating), a temperature of a refrigerant is greatly reduced on a low pressure side in the cycle. A density of the refrigerant thus becomes low, and therefore a flow rate of the refrigerant passing through a heat exchanger on the low pressure side is reduced. In addition, viscosity of the oil is increased due to reduction in the temperature of the refrigerant on the low pressure side in the cycle.

In the refrigeration cycle device, these factors cause frequent oil accumulation in an evaporator on the low pressure side in the cycle. The oil accumulation in the evaporator is unfavorable because the oil accumulation may reduce reliability of the compressor.

An object of the present disclosure is to provide a refrigeration cycle device in which oil accumulation is reduced during a room interior heating.

According to an exemplar embodiment of the present disclosure, a refrigeration cycle device is capable of performing a room interior heating in which ventilation air to be blown into a space to be air conditioned is heated. The refrigeration cycle device includes: a compressor configured to compress and discharge a refrigerant containing oil; a refrigerant radiator configured to heat the ventilation air using the refrigerant discharged from the compressor as a heat source during the room interior heating; a refrigerant decompression unit configured to decompress the refrigerant having passed through the refrigerant radiator; an evaporator configured to evaporate the refrigerant and to function as a heat absorber during the room interior heating; and a controller configured to control a throttle opening degree of the refrigerant decompression unit. In this case, the controller is configured to perform, at least during the room interior heating, a fluctuation operation in which the throttle opening degree of the refrigerant decompression unit is changed and a refrigerant state on a refrigerant outlet side of the evaporator is alternately changed to a superheated state having a superheat degree and a wet state containing wet vapor.

According to this configuration, when the refrigerant state on the refrigerant outlet side of the evaporator becomes the wet state, the refrigerant in a vapor-liquid two-phase state is drawn into the compressor, at least during the room interior heating. The oil in the cycle is therefore easily returned to the compressor along with the refrigerant.

In particular, during the room interior heating, the refrigerant decompression unit is controlled such that the refrigerant state on the refrigerant outlet side of the evaporator is alternately changed to the superheated state and the wet state. In this way, the wet state and the superheated state, which is a state where the refrigerant state is easily identified, are alternately repeated. Dryness of the refrigerant in the wet state can be thus controlled not to become too low. Liquid compression in the compressor can be therefore reduced.

Here, the "wet state" is a state in which the refrigerant becomes wet vapor and has dryness exceeding 0% and being 100% or less. The "superheated state" is a state in which the refrigerant becomes dry vapor and has a superheat degree.

According to another exemplar embodiment of the present disclosure, a refrigeration cycle device is capable of performing a room interior heating in which ventilation air to be blown into a space to be air conditioned is heated, a device cooling in which a heat generating device is cooled, and a room interior cooling in which the ventilation air is cooled. The refrigeration cycle device includes: a compressor configured to compress and discharge a refrigerant containing oil; a refrigerant radiator configured to heat the ventilation air to be blown into the space to be air conditioned using the refrigerant discharged from the compressor as a heat source during the room interior heating; a refrigerant decompression unit configured to decompress the refrigerant having passed through the refrigerant radiator; a parallel decompression unit disposed in parallel with the refrigerant decompression unit on a downstream side of the refrigerant radiator in a refrigerant flow; a device cooler configured to cool the heat generating device using latent heat of evaporation of the refrigerant decompressed in the refrigerant decompression unit during the device cooling, and to function as a heat absorber during the room interior heating; an air-conditioning cooler configured to cool the ventilation air using the latent heat of evaporation of the refrigerant decompressed in the parallel decompression unit; and a controller configured to control a throttle opening degree of the refrigerant decompression unit and a throttle opening degree of the parallel decompression unit. In this case, the controller is configured to perform, at least during the room interior heating, a fluctuation operation in which the throttle opening degree of the refrigerant decompression unit is changed and a refrigerant state on a refrigerant outlet side of the device cooler is alternately changed to a superheated state having a superheat degree and a wet state containing wet vapor.

According to this configuration, when the refrigerant state on the refrigerant outlet side of the device cooler becomes the wet state, the refrigerant in a vapor-liquid two-phase state is drawn into the compressor, at least during the room interior heating. The oil in the cycle is therefore easily returned to the compressor along with the refrigerant.

In particular, during the room interior heating, the refrigerant decompression unit is controlled such that the refrigerant state on the refrigerant outlet side of the device cooler is alternately changed to the superheated state and the wet state. In this way, the wet state and the superheated state, which is a state where the refrigerant state can be easily identified, are alternately repeated. Dryness of the refrigerant in the wet state can be thus controlled not to become too low. Liquid compression in the compressor can be therefore reduced.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

The present embodiment will be described with reference to FIGS. 1 to 7. In the present embodiment, an example will be described in which a refrigeration cycle device 10 according to the present disclosure is applied to an air conditioner 1, which is used for adjusting a temperature of a vehicle interior space to an appropriate temperature. In the present embodiment, the vehicle interior space is an example of a space to be air conditioned.

The refrigeration cycle device 10 illustrated in FIG. 1 is mounted on a hybrid vehicle (not illustrated). The hybrid vehicle obtains a driving force for vehicle traveling from an engine (not illustrated) and an electric motor for vehicle traveling (not illustrated). The hybrid vehicle is configured as a plug-in hybrid vehicle in which a battery BT mounted on the vehicle can be charged with power supplied from an external power source when the vehicle is stopped. The driving force output from the engine is used not only for vehicle traveling but also, in some cases, for generating power through a motor-generator. The power generated by the motor-generator and the power supplied from the external power source are stored in the battery BT. The power stored in the battery BT is supplied not only to the electric motor for vehicle traveling but also to various types of vehicle-mounted devices including components of the refrigeration cycle device 10.

The refrigeration cycle device 10 can perform a room interior heating (e.g., vehicle interior heating), a room interior cooling (e.g., vehicle interior cooling), and a device cooling. The room interior heating is performed for heating ventilation air to be blown into the vehicle interior. The room interior cooling is performed for cooling ventilation air to be blown into the vehicle interior. The device cooling is performed for cooling the battery BT.

The refrigeration cycle device 10 is formed by a vapor-compression refrigeration cycle. The refrigeration cycle device 10 includes a refrigerant circuit 100 through which a refrigerant circulates. The refrigeration cycle device 10 includes a compressor 11, a refrigerant radiator 12, a first decompression unit 13, a device cooler 14, a second decompression unit 15, an air-conditioning cooler 16, and an evaporation pressure regulation valve 17, which are arranged in the refrigerant circuit 100.

The refrigerant circuit 100 is filled with a fluorocarbon refrigerant (for example, HFC-134a) in a sealed manner as a refrigerant. The refrigerant circuit 100 is maintained as a subcritical cycle in which a pressure on a high pressure side in the cycle does not exceed a critical pressure of the refrigerant. The refrigerant may be a refrigerant other than the HFO-134a.

Oil (that is, refrigerating machine oil) for lubricating the compressor 11 is mixed in the refrigerant. A polyalkylene glycol oil (that is, PAG oil) having compatibility with a liquid-phase refrigerant, for example, is used for the oil. A portion of the oil circulates in the cycle along with the refrigerant.

The refrigerant circuit 100 has, as flow paths through which the refrigerant flows, a first refrigerant flow path 100a, a second refrigerant flow path 100b, and a third refrigerant flow path 100c. In the refrigerant circuit 100, the second refrigerant flow path 100b and the third refrigerant flow path 100c are connected to the first refrigerant flow path 100a such that the refrigerant flows through the second refrigerant flow path 100b and the third refrigerant flow path 100c in parallel.

The compressor 11 and the refrigerant radiator 12 are disposed in series in the first refrigerant flow path 100a. Specifically, the refrigerant radiator 12 is disposed on a downstream side of the compressor 11 in the first refrigerant flow path 100a.

The first decompression unit 13 and the device cooler 14 are disposed in series in the second refrigerant flow path 100b. Specifically, the device cooler 14 is disposed on a downstream side of the first decompression unit 13 in the second refrigerant flow path 100b.

The second decompression unit 15 and the air-conditioning cooler 16 are disposed in series in the third refrigerant flow path 100c. Specifically, the air-conditioning cooler 16 is disposed on a downstream side of the second decompression unit 15 in the third refrigerant flow path 100c.

The compressor 11 is a device that compresses and discharges the refrigerant. The compressor 11 is an electric compressor in which a compressing mechanism portion that compresses the refrigerant is rotationally driven by an electric motor. A rotational speed of the electric motor in the compressor 11 is controlled by a control signal output from a controller 80, which will be described later.

The refrigerant radiator 12 is connected to a refrigerant discharge side of the compressor 11. The refrigerant radiator 12 releases heat from the refrigerant discharged from the compressor 11. The refrigerant radiator 12 is a heat exchanger that releases heat from a high-temperature and high-pressure refrigerant (hereinafter also referred to as a high-pressure refrigerant) discharged from the compressor 11 to a high-temperature heat medium circulating in a high-temperature heat medium circuit 30.

The refrigerant radiator 12 includes a condensing portion 121, a liquid receiving portion 122, and a subcooling portion 123. The condensing portion 121 condenses the high-pressure refrigerant by releasing heat from the high-pressure refrigerant to the high-temperature heat medium. The liquid receiving portion 122 separates the refrigerant having passed through the condensing portion 121 into vapor-phase and liquid-phase refrigerants. The liquid receiving portion 122 then stores the separated liquid-phase refrigerant as a surplus refrigerant in the cycle. The subcooling portion 123 subcools the liquid-phase refrigerant stored in the liquid receiving portion 122 by releasing heat from the liquid-phase refrigerant to the high-temperature heat medium before the high-temperature heat medium flows into the condensing portion 121.

The refrigerant radiator 12 heats the ventilation air to be blown into the vehicle interior using the refrigerant discharged from the compressor 11 as a heat source. Specifically, the refrigerant radiator 12 can heat the ventilation air by releasing heat from the high-pressure refrigerant to the ventilation air to be blown into the vehicle interior through the high-temperature heat medium circuit 30.

The high-temperature heat medium circuit 30 is a circuit in which the high-temperature heat medium is circulated. A solution, an antifreezing fluid, or the like containing ethylene glycol, for example, is used for the high-temperature heat medium. The high-temperature heat medium is a first heat medium in the present embodiment. The refrigerant radiator 12, a high-temperature side pump 31, a heater core 32, a high-temperature side radiator 33, a high-temperature side flow-rate regulation valve 34, and other components are disposed in the high-temperature heat medium circuit 30.

The high-temperature side pump 31 is a pump that pumps the high-temperature heat medium to the refrigerant radiator 12, in the high-temperature heat medium circuit 30. The high-temperature side pump 31 is an electric pump whose rotational speed is controlled in accordance with a control signal output from the controller 80.

The heater core 32 is disposed in a casing 61 of a vehicle interior air-conditioning unit 60, which will be described later. The heater core 32 is a heat exchanger that exchanges heat between the high-temperature heat medium heated through the refrigerant radiator 12 and ventilation air having passed through the air-conditioning cooler 16, which will be described later, and thus heats the ventilation air.

The high-temperature side radiator 33 is a heat exchanger that releases heat from the high-temperature heat medium heated through the refrigerant radiator 12 to outside air. The high-temperature side radiator 33 is disposed on a front side of the vehicle that receives traveling air during vehicle traveling. The high-temperature side radiator 33 and the heater core 32 are connected in parallel, with respect to a flow of the high-temperature heat medium, in the high-temperature heat medium circuit 30.

The high-temperature side flow-rate regulation valve 34 is a flow-rate regulation valve that regulates a ratio between flow rates of a portion of the high-temperature heat medium flowing into the heater core 32 and a portion of the high-temperature heat medium flowing into the high-temperature side radiator 33 in the high-temperature heat medium heated through the refrigerant radiator 12. The high-temperature side flow-rate regulation valve 34 is a three-way valve type flow-rate regulation valve. The high-temperature side flow-rate regulation valve 34 is disposed at a connection portion of an inlet side of the heater core 32 and an inlet side of the high-temperature side radiator 33 in the high-temperature heat medium circuit 30.

In the high-temperature heat medium circuit 30 configured as described above, the way the high-pressure refrigerant is used can be changed by allowing the high-temperature side flow-rate regulation valve 34 to regulate the above-described ratio between the flow rates. For example, in the high-temperature heat medium circuit 30, the flow rate of the portion of the high-temperature heat medium flowing into the heater core 32 can be increased by the high-temperature side flow-rate regulation valve 34. Heat from the high-temperature heat medium can be thus used for heating the ventilation air. The vehicle interior can be therefore heated. In contrast, for example, in the high-temperature heat medium circuit 30, the flow rate of the portion of the high-temperature heat medium flowing into the high-temperature side radiator 33 can be increased by the high-temperature side flow-rate regulation valve 34. Heat can be thus released from the high-temperature heat medium to outside air.

A refrigerant outlet side of the refrigerant radiator 12 branches into the second refrigerant flow path 100*b* and the third refrigerant flow path 100*c*. The first decompression unit 13 and the device cooler 14 are disposed in the second refrigerant flow path 100*b*. The second decompression unit 15 and the air-conditioning cooler 16 are disposed in the third refrigerant flow path 100*c*.

The first decompression unit 13 is a refrigerant decompressor that decompresses the refrigerant having passed through the refrigerant radiator 12. The first decompression unit 13 has a first on-off valve 131 and a first expansion valve 132. The first on-off valve 131 is fully closable or fully openable. The first on-off valve 131 is an electromagnetic valve that opens and closes the second refrigerant flow path 100*b*. Opening/closing operation of the first on-off valve 131 is controlled in accordance with a control signal from the controller 80, which will be described later.

The first expansion valve 132 is an expansion valve that decompresses a refrigerant flowing through the second refrigerant flow path 100*b*. The first expansion valve 132 is an electric expansion valve having a valve body and an electric actuator. The electric actuator of the first expansion valve 132 includes a stepping motor that displaces the valve body to change a throttle opening degree $\alpha$ of the first expansion valve 132. The throttle opening degree $\alpha$ of the first expansion valve 132 is controlled in accordance with a control signal from the controller 80, which will be described later.

The device cooler 14 is an evaporator (that is, a chiller) that exchanges heat between the refrigerant decompressed in the first decompression unit 13 and a heat medium at a low temperature (hereinafter also referred to as a low-temperature heat medium) circulating in a low-temperature heat medium circuit 40, and thus evaporates the refrigerant. In the device cooler 14, the refrigerant absorbs heat from the low-temperature heat medium and thus evaporates. The low-temperature heat medium is therefore cooled in the device cooler 14. The device cooler 14 is a stacked-type heat exchanger that is configured such that a plurality of refrigerant flow path portions through which the refrigerant flows and a plurality of heat medium flow path portions through which the low-temperature heat medium flows are alternately stacked.

The device cooler 14 according to the present embodiment functions as a cooler, during device cooling, that cools the battery BT using latent heat of evaporation of the refrigerant decompressed in the first decompression unit 13. The device cooler 14 according to the present embodiment also functions as a heat absorber during a room interior heating. Specifically, the device cooler 14 cools the battery BT during the device cooling and absorbs heat from outside air during the room interior heating, through the low-temperature heat medium circuit 40.

The low-temperature heat medium circuit 40 is a heat medium circuit in which the heat medium at the low temperature circulates. A solution, an antifreezing fluid, or the like containing ethylene glycol, for example, is used for the low-temperature heat medium. The low-temperature heat medium is a second heat medium in the present embodiment. The device cooler 14, a low-temperature side pump 41, a battery cooling unit 42, a low-temperature side radiator 43, a first flow path switching valve 44, a second flow path switching valve 45, and other components are disposed in low-temperature heat medium circuit 40.

The low-temperature side pump 41 is a pump that pumps the low-temperature heat medium to the device cooler 14, in the low-temperature heat medium circuit 40. The low-temperature side pump 41 is an electric pump whose rotational speed is controlled in accordance with a control signal output from the controller 80.

The battery cooling unit 42 cools the battery BT using the low-temperature heat medium flowing through the low-temperature heat medium circuit 40. The battery BT is electrically connected to an inverter (not illustrated) and a charger (not illustrated). The battery BT supplies power to the inverter and stores power supplied from the charger. The battery BT is, for example, a lithium-ion battery.

The low-temperature side radiator 43 is a heat exchanger that exchanges heat between the low-temperature heat medium cooled through the device cooler 14 and outside air, and thus absorbs heat from the outside air. The low-temperature side radiator 43 is disposed, along with the high-temperature side radiator 33, on the front side of the vehicle that receives traveling air during vehicle traveling. The low-temperature side radiator 43 and the battery cooling unit 42 are connected in parallel, with respect to a flow of the low-temperature heat medium, in the low-temperature heat medium circuit 40.

The first flow path switching valve 44 switches between a state in which the low-temperature heat medium flows into the battery cooling unit 42 and a state in which the low-temperature heat medium does not flow into the battery cooling unit 42. The first flow path switching valve 44 is an electromagnetic valve whose opening/closing operation is controlled in accordance with a control signal output from the controller 80.

The second flow path switching valve 45 switches between a state in which the low-temperature heat medium flows into the low-temperature side radiator 43 and a state in which the low-temperature heat medium does not flow into the low-temperature side radiator 43. The second flow path switching valve 45 is an electromagnetic valve whose opening/closing operation is controlled in accordance with a control signal output from the controller 80.

In the low-temperature heat medium circuit 40 configured as described above, the way a low-pressure refrigerant is used can be changed by allowing the first flow path switching valve 44 and the second flow path switching valve 45 to change the flow paths of the low-temperature heat medium. In the low-temperature heat medium circuit 40, the battery BT can be cooled using the low-temperature heat medium cooled through the device cooler 14. For example, this cooling can be achieved by opening the first flow path switching valve 44. In contrast, in the low-temperature heat medium circuit 40, the low-temperature heat medium can absorb heat from outside air. For example, this heat absorption can be achieved by opening the second flow path switching valve 45 and allowing the low-temperature heat medium to flow through the low-temperature side radiator 43.

The second decompression unit 15 is a parallel decompression unit that is disposed in parallel with the first decompression unit 13 on a refrigerant flow downstream side of the refrigerant radiator 12. The second decompression unit 15 has a second on-off valve 151 and a second expansion valve 152. The second on-off valve 151 is fully closable or fully openable. The second on-off valve 151 is an electromagnetic valve that opens and closes the third refrigerant flow path 100*c*. Opening/closing operation of the second on-off valve 151 is controlled in accordance with a control signal from the controller 80, which will be described later.

The second expansion valve 152 is an expansion valve that decompresses a refrigerant flowing through the third refrigerant flow path 100c. The second expansion valve 152 is an electric expansion valve having a valve body and an electric actuator. The valve body is configured to be able to change a throttle opening degree α, which is an opening degree of the refrigerant flow path. The electric actuator includes a stepping motor that displaces the valve body to change the throttle opening degree α of the second expansion valve 152. The throttle opening degree α of the second expansion valve 152 is controlled in accordance with a control signal from the controller 80, which will be described later.

The air-conditioning cooler 16 is disposed in the casing 61 of the vehicle interior air-conditioning unit 60, which will be described later. The air-conditioning cooler 16 is a heat exchanger that exchanges heat between the refrigerant decompressed in the second decompression unit 15 and ventilation air to be blown into the vehicle interior, and thus evaporates the refrigerant. The air-conditioning cooler 16 cools the ventilation air using latent heat of evaporation of the refrigerant decompressed in the second decompression unit 15. That is, in the air-conditioning cooler 16, the low-pressure refrigerant absorbs heat from the ventilation air and thus evaporates. The ventilation air is therefore cooled in the air-conditioning cooler 16.

The evaporation pressure regulation valve 17 is disposed on a refrigerant outlet side of the air-conditioning cooler 16. The evaporation pressure regulation valve 17 is a pressure regulation valve that maintains a pressure of a refrigerant on the refrigerant outlet side of the air-conditioning cooler 16 higher than a pressure of a refrigerant on a refrigerant outlet side of the device cooler 14. Specifically, the evaporation pressure regulation valve 17 is configured such that a temperature of the refrigerant on the refrigerant outlet side of the air-conditioning cooler 16 is maintained at or above a temperature (for example, 1° C.) at which frost formation in the air-conditioning cooler 16 can be reduced.

In the refrigeration cycle device 10 configured as described above, the second refrigerant flow path 100b and the third refrigerant flow path 100c are connected to the first refrigerant flow path 100a on a downstream side of the evaporation pressure regulation valve 17. The refrigeration cycle device 10 has a cycle structure (that is, an accumulator-less cycle) in which the device cooler 14 and the air-conditioning cooler 16 are connected to a refrigerant inlet side of the compressor 11 without interposing a liquid receiving portion (accumulator). Specifically, the refrigeration cycle device 10 has a cycle structure (that is, a receiver cycle) in which the liquid receiving portion 122 is provided on the high pressure side in the cycle and a liquid receiving portion is not provided on a low pressure side in the cycle.

Next, the vehicle interior air-conditioning unit 60 will be described with reference to FIG. 1. The vehicle interior air-conditioning unit 60 illustrated in FIG. 1 is a unit that adjusts a temperature of the ventilation air to be blown into the vehicle interior to an appropriate temperature. The vehicle interior air-conditioning unit 60 is disposed inside an instrument panel that is located in a foremost portion of the vehicle interior. The vehicle interior air-conditioning unit 60 has the casing 61 formed as an outer shell, inside which the air-conditioning cooler 16, the heater core 32, and other components are housed.

The casing 61 is a path forming portion that forms air flow paths for the ventilation air to be blown into the vehicle interior. Although not illustrated, an inside/outside air box is disposed on an air flow upstream side of the casing 61. The inside/outside air box regulates a ratio of introduction of inside air to outside air that are to be introduced into the casing 61.

A blower 62 is disposed inside the casing 61. The blower 62 is disposed for blowing the air introduced from the inside/outside air box into the vehicle interior. The blower 62 is an electric blower in which a centrifugal fan is rotated by an electric motor. A rotational speed of the blower 62 is controlled in accordance with a control signal output from the controller 80, which will be described later.

The air-conditioning cooler 16 is disposed inside the casing 61 on an air flow downstream side of the blower 62. An air flow downstream side of the air-conditioning cooler 16 is divided into a warm air flow path 63 and a cool air flow path 64 inside the casing 61. The heater core 32 is disposed in the warm air flow path 63. The cool air flow path 64 is a flow path that allows air having passed through the air-conditioning cooler 16 to flow such that the air bypasses the heater core 32.

An air mix door 65 is disposed inside the casing 61 between the air-conditioning cooler 16 and the heater core 32. The air mix door 65 regulates a ratio of volume of air passing through the warm air flow path 63 to air passing through the cool air flow path 64. An air mix space 66 is formed inside the casing 61 on downstream sides of the warm air flow path 63 and the cool air flow path 64. The air mix space 66 is formed for mixing warm air having passed through the warm air flow path 63 and cool air having passed through the cool air flow path 64. Although not illustrated, a plurality of opening holes is formed in the most downstream portion of the air flow inside the casing 61. The opening holes are formed for blowing out the ventilation air, whose temperature has been adjusted to a desired temperature in the air mix space 66, into the vehicle interior.

Next, an outline of an electronic control unit of the air conditioner 1 will be described with reference to FIG. 2. The controller 80 includes a computer having a processor and a memory, and peripheral circuits of the computer. The controller 80 performs various types of computations and processing based on programs stored in the memory, and controls various types of devices connected to an output side of the controller 80. The memory of the controller 80 is a non-transitory tangible storage medium.

The various devices including components of the refrigeration cycle device 10 are connected to the output side of the controller 80. Specifically, the compressor 11, the first decompression unit 13, the second decompression unit 15, the high-temperature side pump 31, the high-temperature side flow-rate regulation valve 34, the low-temperature side pump 41, the flow path switching valves 44, 45, the blower 62, the air mix door 65, and other components are connected to the output side of the controller 80.

A sensor group 81 used for air conditioning control is connected to an input side of the controller 80. The sensor group 81 includes an inside air temperature sensor, an outside air temperature sensor, a solar radiation sensor, PT sensors, and other sensors. The PT sensors detect respective pressures and temperatures on the respective refrigerant outlet sides of the respective coolers 14, 16. The PT sensors function as sensors for sensing respective refrigerant states on the respective refrigerant outlet sides of the respective coolers 14, 16.

Various detection signals are input to the controller 80. The refrigeration cycle device 10 can thus adjust the temperature and the like of the ventilation air to be blown into the vehicle interior in accordance with physical quantities detected by the sensor group 81. Comfortable air conditioning can be therefore achieved.

An operation panel 82 used for various types of input operation is connected to the input side of the controller 80. The operation panel 82 is disposed near the instrument panel and has various types of operation switches. Operation signals from the various operation switches provided on the operation panel 82 are input to the controller 80.

The various operation switches of the operation panel 82 include an auto switch, an operation mode selecting switch, an air-volume setting switch, a temperature setting switch, an air blowing mode selecting switch, and other switches. The refrigeration cycle device 10 can appropriately switch operation modes of the refrigeration cycle device 10 by receiving input from the operation panel 82.

The controller 80 is integrally provided with control units. The control units control the various devices connected to the output side of the controller 80. The controller 80 according to the present embodiment includes an opening degree control unit 80a that controls the first decompression unit 13 and the second decompression unit 15. The opening degree control unit 80a may be configured separately from the controller 80.

Hereinafter, operation of the air conditioner 1 will be described. The air conditioner 1 is configured to be able to perform operation modes including the room interior cooling, the device cooling, and the room interior heating. In the present embodiment, the operation of the air conditioner 1 will be thus described for each of the room interior cooling, the device cooling, and the room interior heating.

Room Interior Cooling (i.e., Vehicle Interior Cooling):

The room interior cooling is an operation mode in which air cooled down to a desired temperature through the vehicle interior air-conditioning unit 60 is blown into the vehicle interior. The controller 80 appropriately determines operation states of various devices during the room interior cooling using detection signals from the sensor group 81 and an operation signal from the operation panel 82.

As illustrated in FIG. 3, the controller 80, for example, controls each of the decompression units 13, 15 such that the first on-off valve 131 is fully closed, the second on-off valve 151 is fully opened, and the second expansion valve 152 is in a variable throttle state. That is, the controller 80 controls the first decompression unit 13 to a fully closed state. The controller 80 thus controls the second decompression unit 15 such that decompression effect is exhibited.

Specifically, the controller 80 performs superheating processing during the room interior cooling. The superheating processing during the room interior cooling is processing in which the second decompression unit 15 is controlled such that a refrigerant state on the refrigerant outlet side of the air-conditioning cooler 16 becomes a superheated state having a constant superheat degree.

The controller 80 also controls the high-temperature side flow-rate regulation valve 34 such that the entire amount of the high-temperature heat medium passing through the refrigerant radiator 12 flows into the high-temperature side radiator 33. The controller 80 further controls the air mix door 65 such that the air mix door 65 is in a position where the warm air flow path 63 is fully closed and the cool air flow path 64 is fully opened. The controller 80 appropriately determines control signals for other devices, using detection signals from the sensor group 81 and an operation signal from the operation panel 82.

In the refrigeration cycle device 10 during the room interior cooling, the high-pressure refrigerant discharged from the compressor 11 flows into the condensing portion 121 of the refrigerant radiator 12. The refrigerant having flowed into the condensing portion 121 releases heat to the high-temperature heat medium flowing through the high-temperature heat medium circuit 30, and thus condenses. The high-temperature heat medium flowing through the high-temperature heat medium circuit 30 is thus heated, and a temperature of the high-temperature heat medium therefore increases.

The high-temperature heat medium heated through the condensing portion 121 flows to the high-temperature side radiator 33 and releases heat to outside air. That is, heat of the high-pressure refrigerant in the cycle is released to the outside air through the high-temperature heat medium during the room interior cooling.

The refrigerant having passed through the condensing portion 121 flows into the liquid receiving portion 122 and is separated into vapor-phase and liquid-phase refrigerants. The liquid-phase refrigerant separated in the liquid receiving portion 122 then flows into the subcooling portion 123. The refrigerant having flowed into the subcooling portion 123 releases heat to the high-temperature heat medium flowing through the high-temperature heat medium circuit 30, and thus is subcooled.

The refrigerant having flowed out of the subcooling portion 123 flows into the second decompression unit 15, and is decompressed in the second expansion valve 152 of the second decompression unit 15. The first on-off valve 131 is fully closed during the room interior cooling. The refrigerant thus does not flow into the first expansion valve 132. The entire amount of the refrigerant is therefore decompressed in the second decompression unit 15.

The refrigerant decompressed in the second decompression unit 15 flows into the air-conditioning cooler 16. The refrigerant having flowed into the air-conditioning cooler 16 absorbs heat from ventilation air from the blower 62 and thus evaporates. The ventilation air from the blower 62 is therefore cooled.

The refrigerant having passed through the air-conditioning cooler 16 is drawn into the compressor 11 through the evaporation pressure regulation valve 17. The refrigerant drawn into the compressor 11 is compressed again in the compressor 11 until the refrigerant becomes a high-pressure refrigerant.

As a result, the vehicle interior can be cooled by blowing the ventilation air cooled through the air-conditioning cooler 16 into the vehicle interior during the room interior cooling.

Device Cooling:

The device cooling is an operation mode in which the battery BT, which is a heat generating device, is cooled using latent heat of evaporation of the refrigerant. The controller 80 appropriately determines operation states of various devices during the device cooling using detection signals from the sensor group 81 and an operation signal from the operation panel 82.

As illustrated in FIG. 3, the controller 80, for example, controls each of the decompression units 13, 15 such that the second on-off valve 151 is fully closed, the first on-off valve 131 is fully opened, and the first expansion valve 132 is in a variable throttle state. That is, the controller 80 controls the second decompression unit 15 to a fully closed state. The controller 80 thus controls the first decompression unit 13 such that decompression effect is exhibited.

Specifically, the controller 80 performs superheating processing during the device cooling. The superheating processing during the device cooling is processing in which the first decompression unit 13 is controlled such that a refrigerant state on the refrigerant outlet side of the device cooler 14 becomes a superheated state having a constant superheat degree.

The controller 80 also controls the high-temperature side flow-rate regulation valve 34 such that the entire amount of the high-temperature heat medium passing through the refrigerant radiator 12 flows into the high-temperature side radiator 33. The controller 80 further controls the first flow path switching valve 44 to a fully opened state and controls the second flow path switching valve 45 to a fully closed state such that the entire amount of the low-temperature heat medium passing through the device cooler 14 flows into the battery cooling unit 42. The controller 80 appropriately determines control signals for other devices, using detection signals from the sensor group 81 and an operation signal from the operation panel 82.

In the refrigeration cycle device 10 during device cooling, the high-pressure refrigerant discharged from the compressor 11 flows into the condensing portion 121 of the refrigerant radiator 12. As indicated by a solid line in FIG. 4, the refrigerant having flowed into the condensing portion 121 releases heat to the high-temperature heat medium flowing through the high-temperature heat medium circuit 30, and thus condenses (that is, point A1 to point A2 in FIG. 4). The high-temperature heat medium flowing through the high-temperature heat medium circuit 30 is thus heated, and a temperature of the high-temperature heat medium therefore increases.

The high-temperature heat medium heated through the condensing portion 121 flows to the high-temperature side radiator 33 and releases heat to outside air. That is, heat of the high-pressure refrigerant in the cycle is released to the outside air through the high-temperature heat medium during the device cooling.

The refrigerant having passed through the condensing portion 121 flows into the liquid receiving portion 122 and is separated into vapor-phase and liquid-phase refrigerants. The liquid-phase refrigerant separated in the liquid receiving portion 122 then flows into the subcooling portion 123. The refrigerant having flowed into the subcooling portion 123 releases heat to the high-temperature heat medium flowing through the high-temperature heat medium circuit 30, and thus is subcooled (that is, point A2 to point A3 in FIG. 4).

Figure 4:
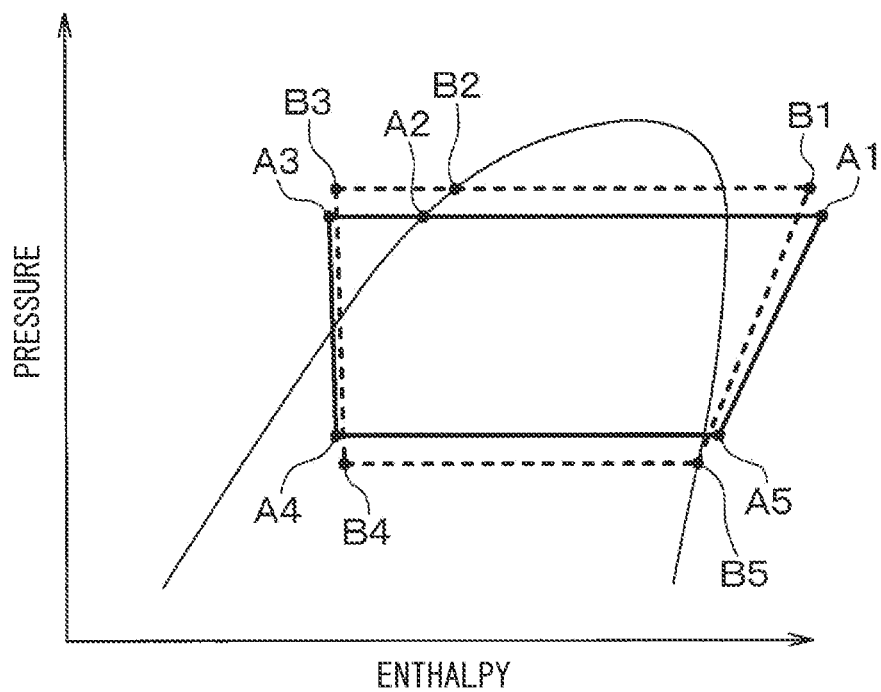
FIG. 4 is a Mollier diagram illustrating a refrigerant state during device cooling and during a room interior heating.

The refrigerant having flowed out of the subcooling portion 123 flows into the first decompression unit 13, and is decompressed in the first expansion valve 132 of the first decompression unit 13 (that is, point A3 to point A4 in FIG. 4). The second on-off valve 151 is fully closed during the device cooling. The refrigerant thus does not flow into the second expansion valve 152. The entire amount of the refrigerant is therefore decompressed in the first decompression unit 13.

The refrigerant decompressed in the first decompression unit 13 flows into the device cooler 14. The refrigerant having flowed into the device cooler 14 absorbs heat from the low-temperature heat medium flowing through the low-temperature heat medium circuit 40 and thus evaporates (that is, point A4 to point A5 in FIG. 4). The low-temperature heat medium is therefore cooled.

A throttle opening degree α of the first decompression unit 13 is set such that a refrigerant state on the refrigerant outlet side of the device cooler 14 becomes a superheated state during the device cooling. The refrigerant having passed through the device cooler 14 thus becomes a vapor-phase refrigerant having a superheat degree, and is drawn into the compressor 11. The refrigerant drawn into the compressor 11 is compressed again in the compressor 11 until the refrigerant becomes a high-pressure refrigerant.

The low-temperature heat medium cooled by the device cooler 14 flows into the battery cooling unit 42 and absorbs heat from the battery BT. The battery BT is therefore cooled. That is, the battery BT is cooled using latent heat of evaporation of the refrigerant in the device cooler 14 during the device cooling.

As described above, the battery BT can be cooled by supplying the low-temperature heat medium cooled through the device cooler 14 to the battery cooling unit 42 during the device cooling.

In the device cooling described above, an example is illustrated in which the high-temperature side flow-rate regulation valve 34 is controlled such that the entire amount of the high-temperature heat medium passing through the refrigerant radiator 12 flows into the high-temperature side radiator 33. However, the control of the high-temperature side flow-rate regulation valve 34 is not limited to this. For example, when heating of the vehicle interior is required during the device cooling, the high-temperature side flow-rate regulation valve 34 may be controlled by the controller 80 such that the high-temperature heat medium passing through the refrigerant radiator 12 flows into the heater core 32. According to this control, the device cooling and the room interior heating can be simultaneously performed.

In the device cooling described above, an example is illustrated in which each of the decompression units 13, 15 is controlled such that the second on-off valve 151 is fully closed, the first on-off valve 131 is fully opened, and the throttle opening degree α of the first expansion valve 132 becomes the predetermined opening degree. However, the control is not limited to this. For example, when the room interior cooling is required during the device cooling, the second decompression unit 15 may be controlled by the controller 80 such that the second on-off valve 151 is fully opened and the throttle opening degree α of the second expansion valve 152 becomes a predetermined opening degree. According to this control, the device cooling and the room interior cooling can be simultaneously performed.

Room Interior Heating (Vehicle Interior Heating):

The room interior heating is an operation mode in which air heated to a desired temperature through the vehicle interior air-conditioning unit 60 is blown into the vehicle interior. The controller 80 appropriately determines operation states of various devices during the room interior heating, using detection signals from the sensor group 81 and an operation signal from the operation panel 82.

As illustrated in FIG. 3, the controller 80, for example, controls each of the decompression units 13, 15 such that the second on-off valve 151 is fully closed, the first on-off valve 131 is fully opened, and the first expansion valve 132 is in a variable throttle state. That is, the controller 80 controls the second decompression unit 15 to a fully closed state. The controller 80 thus controls the first decompression unit 13 such that decompression effect is exhibited. Basically, the controller 80 controls the first decompression unit 13 such that a throttle opening degree α of the first expansion valve 132 during the room interior heating is smaller than the throttle opening degree α of the first expansion valve 132 during the device cooling.

Specifically, the controller 80 performs fluctuation processing (i.e., fluctuation operation) during the room interior heating. The fluctuation processing is an operation in which the throttle opening degree α of the first expansion valve 132 is changed such that a refrigerant state on the refrigerant outlet side of the device cooler 14 is alternately changed to a superheated state having a superheat degree and a wet state containing wet vapor.

The controller 80 also controls the high-temperature side flow-rate regulation valve 34 such that the entire amount of the high-temperature heat medium passing through the refrigerant radiator 12 flows into the heater core 32. The controller 80 further controls the first flow path switching valve 44 to a fully closed state and controls the second flow path switching valve 45 to a fully opened state such that the entire amount of the low-temperature heat medium passing through the device cooler 14 flows into the low-temperature side radiator 43.

The controller 80 controls the air mix door 65 such that the air mix door 65 is in a position where the cool air flow path 64 is fully closed and the warm air flow path 63 is fully opened. The controller 80 appropriately determines control signals for other devices, using detection signals from the sensor group 81 and an operation signal from the operation panel 82.

Hereinafter, a flow of the fluctuation processing performed by the controller 80 according to the present embodiment will be described with reference to FIGS. 5 and 6. The processing illustrated in FIG. 5 is performed by the controller 80 when the room interior heating is performed, for example.

Figure 5:
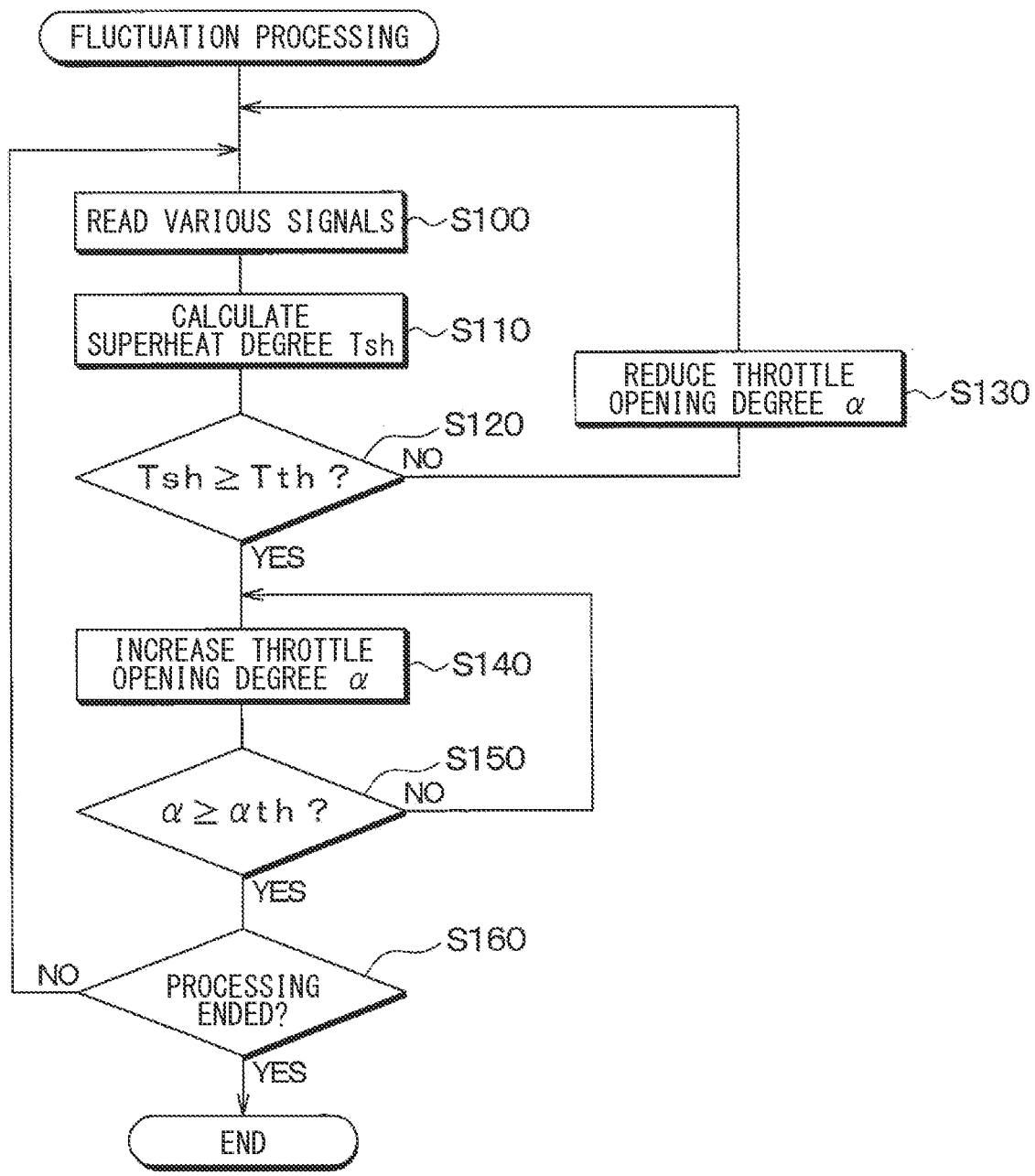
FIG. 5 is a flowchart illustrating a flow of control processing performed by the controller of the refrigeration cycle device according to the first embodiment.

As illustrated in FIG. 5, the controller 80 reads various signals input from the sensor group 81 and the operation panel 82 in step S100. In step S110, the controller 80 calculates a superheat degree Tsh on the refrigerant outlet side of the device cooler 14.

The controller 80 calculates the superheat degree Tsh based on a temperature and a pressure on the refrigerant outlet side of the device cooler 14. For example, a saturation temperature of the refrigerant on the refrigerant outlet side of the device cooler 14 can be identified from an intersection point where the pressure on the refrigerant outlet side of the device cooler 14 intersects with a saturated liquid line illustrated on the Mollier diagram. The superheat degree Tsh can be calculated by subtracting the saturation temperature of the refrigerant from the temperature on the refrigerant outlet side of the device cooler 14.

When the refrigerant state on the refrigerant outlet side of the device cooler 14 is in the wet state, the temperature on the refrigerant outlet side of the device cooler 14 is the saturation temperature. In this case, the superheat degree Tsh is substantially zero. Information on the superheat degree Tsh can thus also provide information on whether the refrigerant state is the wet state.

In step S120, the controller 80 determines whether the superheat degree Tsh is equal to or higher than a predetermined threshold temperature Tth. The threshold temperature Tth is set for restraining the superheat degree Tsh from becoming too large. The threshold temperature Tth is set to, for example, 2 to 4° C. As illustrated in FIG. 6, the threshold temperature Tth is set to a value higher than a value on a saturation line that indicates the saturation temperature of the refrigerant. That is, the threshold temperature Tth is set to a temperature higher than the saturation temperature of the refrigerant.

When the superheat degree Tsh is lower than the threshold temperature Tth as a result of the determination processing in step S120, the controller 80 proceeds to step S130. In step S130, the controller 80 controls the first decompression unit 13 such that the throttle opening degree $\alpha$ of the first expansion valve 132 is reduced. Then, the controller 80 returns to step S100. Specifically, the controller 80 controls the stepping motor of the first expansion valve 132 such that the throttle opening degree $\alpha$ of the first expansion valve 132 is gradually reduced. That is, as illustrated in FIG. 6, the controller 80 gradually reduces the throttle opening degree $\alpha$ of the first expansion valve 132 until the superheat degree Tsh reaches the threshold temperature Tth.

When the superheat degree Tsh is equal to or higher than the threshold temperature Tth as a result of the determination processing in step S120, the controller 80 proceeds to step S140. In step S140, the controller 80 controls the first decompression unit 13 such that the throttle opening degree $\alpha$ of the first expansion valve 132 is gradually increased. Specifically, the controller 80 controls the stepping motor of the first expansion valve 132 such that the throttle opening degree $\alpha$ of the first expansion valve 132 is gradually increased.

Figure 6:
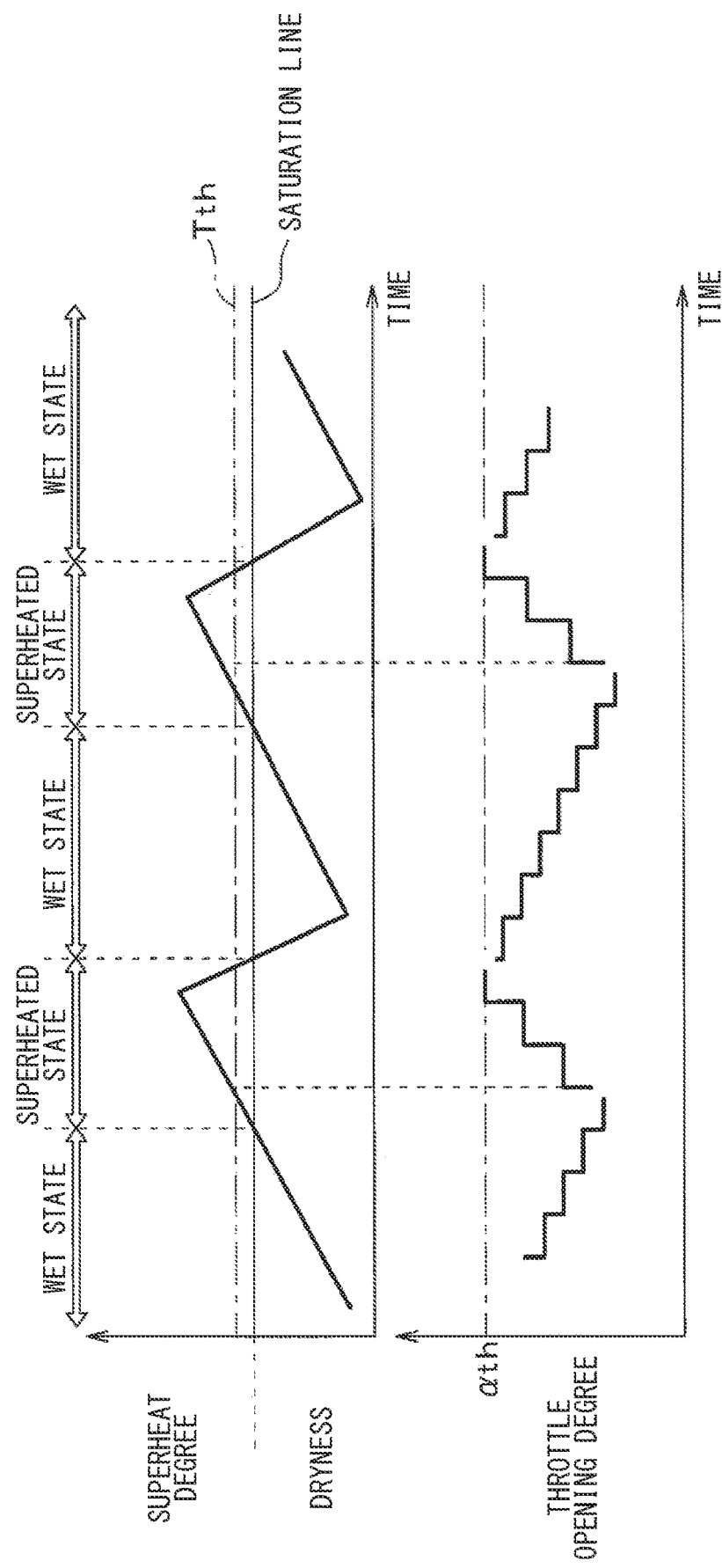
FIG. 6 is a diagram illustrating operation of a first decompression unit during the room interior heating.

As illustrated in FIG. 6, the controller 80 controls the first decompression unit 13 such that variation in the throttle opening degree $\alpha$ per unit time is greater when the throttle opening degree $\alpha$ of the first expansion valve 132 is increased, than when the throttle opening degree $\alpha$ of the first expansion valve 132 is reduced. Specifically, the controller 80 controls the stepping motor of the first expansion valve 132 such that variation in the throttle opening degree $\alpha$ per unit step is greater when the throttle opening degree $\alpha$ of the first expansion valve 132 is increased, than when the throttle opening degree $\alpha$ of the first expansion valve 132 is reduced.

According to this control, a period during which the refrigerant state becomes the wet state is sufficiently ensured. A flow of the refrigerant in a vapor-liquid two-phase state flowing into a side of the compressor 11 is thus facilitated. The oil in the cycle is therefore easily returned to the compressor 11 along with the refrigerant.

In step S150, the controller 80 determines whether the throttle opening degree $\alpha$ of the first expansion valve 132 is equal to or greater than a predetermined reference opening degree $\alpha$th. The reference opening degree $\alpha$th is set to a throttle opening degree $\alpha$ at which the refrigerant state on the refrigerant outlet side of the device cooler 14 becomes the wet state.

The throttle opening degree $\alpha$ leading to the wet state can be predicted based on variation in a superheat degree when the throttle opening degree $\alpha$ of the first expansion valve 132 is reduced and variation in the superheat degree Tsh when the throttle opening degree $\alpha$ of the first expansion valve 132 is increased. For example, a throttle opening degree $\alpha$ of the first expansion valve 132 at which the refrigerant state on the refrigerant outlet side of the device cooler 14 becomes a saturated state can be estimated. This estimation can be made from a relationship between a throttle opening degree $\alpha$ of the first expansion valve 132 and a superheat degree Tsh until the superheat degree Tsh becomes a value equal to or higher than the threshold temperature Tth. The reference opening degree $\alpha$th is set to, for example, a value obtained by adding a predetermined value $\Delta\alpha$ to a certain throttle opening degree $\alpha$ of the first expansion valve 132. The certain throttle opening degree $\alpha$ is a throttle opening degree when the throttle opening degree $\alpha$ of the first expansion valve 132 is gradually reduced and the refrigerant state on the refrigerant outlet side of the device cooler 14 becomes the saturated state.

When the throttle opening degree $\alpha$ of the first expansion valve 132 is smaller than the reference opening degree $\alpha$th as a result of the determination processing in step S150, the controller 80 returns to step S140. That is, the controller 80 increases the throttle opening degree $\alpha$ of the first expansion valve 132 until the throttle opening degree α of the first expansion valve 132 reaches the reference opening degree αth.

When the throttle opening degree α of the first expansion valve 132 is equal to or greater than the reference opening degree αth as a result of the determination processing in step S150, the controller 80 proceeds to step S160. In step S160, the controller 80 determines whether an end condition of the fluctuation processing is satisfied. The end condition of the fluctuation processing is, for example, a condition that is satisfied when the operation of the air conditioner 1 that performs the room interior heating is stopped.

When the end condition of the fluctuation processing is satisfied as a result of the determination processing in step S160, the controller 80 ends the fluctuation processing. When the end condition of the fluctuation processing is not satisfied, the controller 80 returns to step S100.

In the refrigeration cycle device 10, when the controller 80 performs the fluctuation processing during the room interior heating, the refrigerant state on the refrigerant outlet side of the device cooler 14 is alternately switched between the superheated state and the wet state as illustrated in FIG. 6.

When such control processing during the room interior heating is performed, the high-pressure refrigerant discharged from the compressor 11 flows into the condensing portion 121 of the refrigerant radiator 12 in the refrigeration cycle device 10. As indicated by a broken line in FIG. 4, the refrigerant having flowed into the condensing portion 121 releases heat to the high-temperature heat medium flowing through the high-temperature heat medium circuit 30, and thus condenses (that is, point B1 to point B2 in FIG. 4). The high-temperature heat medium flowing through the high-temperature heat medium circuit 30 is thus heated, and a temperature of the high-temperature heat medium therefore increases.

The high-temperature heat medium heated through the condensing portion 121 flows into the heater core 32 and releases heat to the ventilation air to be blown into the vehicle interior. That is, heat of the high-pressure refrigerant in the cycle is released to the ventilation air to be blown into the vehicle interior through the high-temperature heat medium during the room interior heating.

The refrigerant having passed through the condensing portion 121 flows into the liquid receiving portion 122 and is separated into vapor-phase and liquid-phase refrigerants. The liquid-phase refrigerant separated in the liquid receiving portion 122 then flows into the subcooling portion 123. The refrigerant having flowed into the subcooling portion 123 releases heat to the high-temperature heat medium flowing through the high-temperature heat medium circuit 30, and thus is subcooled (that is, point B2 to point B3 in FIG. 4).

The refrigerant having flowed out of the subcooling portion 123 flows into the first decompression unit 13, and is decompressed in the first expansion valve 132 of the first decompression unit 13 (that is, point B3 to point B4 in FIG. 4). The second on-off valve 151 is fully closed during the room interior heating. The refrigerant thus does not flow into the second expansion valve 152. The entire amount of the refrigerant is therefore decompressed in the first decompression unit 13.

Figure 7:
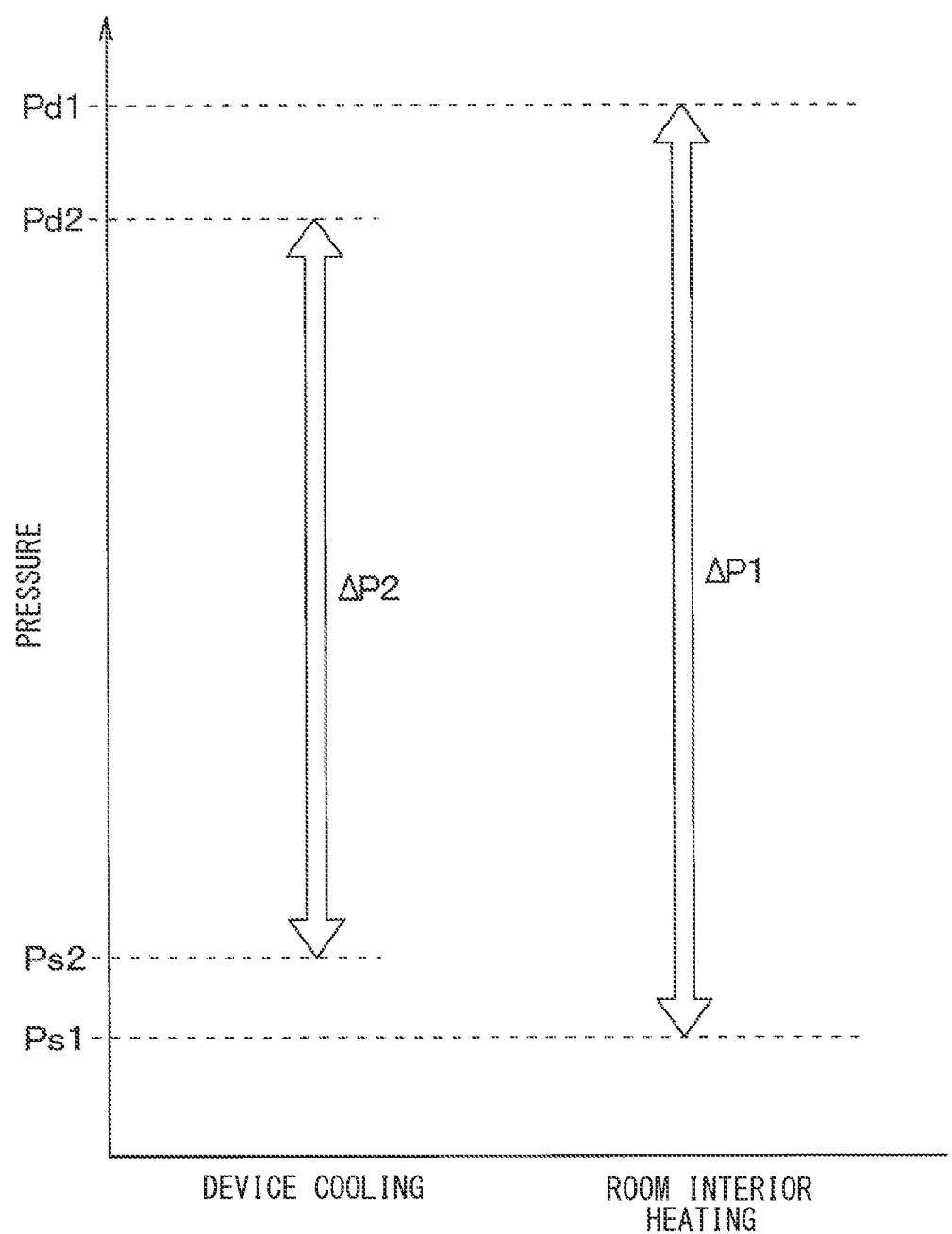
FIG. 7 is a diagram illustrating high-low pressure differences of a refrigerant in a cycle during the device cooling and during the room interior heating.

The throttle opening degree α of the first expansion valve 132 is smaller during the room interior heating than during the device cooling. As illustrated in FIG. 7, a pressure Pd of the high-pressure refrigerant during the room interior heating is thus balanced to be higher than a pressure Pd of the high-pressure refrigerant during the device cooling (that is, Pd1>Pd2). Simultaneously, a pressure Ps of the low-pressure refrigerant during the room interior heating is balanced to be lower than a pressure Ps of the low-pressure refrigerant during the device cooling (that is, Ps1<Ps2). That is, a high-low pressure difference ΔP1 of the refrigerant in the cycle during the room interior heating is larger than a high-low pressure difference ΔP2 of the refrigerant in the cycle during the device cooling.

A temperature of the refrigerant decompressed in the first decompression unit 13 may thus become very low during the room interior heating. In this case, a density of the refrigerant flowing on the low pressure side in the cycle is reduced, and thus a flow rate of the refrigerant passing through the heat exchanger on the low pressure side is also reduced. Viscosity of the oil is also increased due to the reduction in the temperature of the refrigerant on the low pressure side in the cycle.

The refrigerant decompressed in the first decompression unit 13 flows into the device cooler 14. The refrigerant having flowed into the device cooler 14 absorbs heat from the low-temperature heat medium flowing through the low-temperature heat medium circuit 40 and thus evaporates (that is, point B4 to point B5 in FIG. 4). The low-temperature heat medium is therefore cooled. The low-temperature heat medium cooled by the device cooler 14 flows into the low-temperature side radiator 43 and absorbs heat from outside air.

The throttle opening degree α of the first expansion valve 132 is changed such that the refrigerant state on the refrigerant outlet side of the device cooler 14 is alternately changed to the superheated state and the wet state during the room interior heating. The refrigerant having passed through the device cooler 14 thus becomes a refrigerant in a vapor-liquid two-phase state, and is drawn into the compressor 11. The refrigerant drawn into the compressor 11 is compressed again in the compressor 11 until the refrigerant becomes a high-pressure refrigerant.

As a result, the vehicle interior can be heated by blowing the ventilation air heated through the heater core 32 into the vehicle interior during the room interior heating. The oil in the device cooler 14 is returned to the compressor 11 along with the liquid-phase refrigerant during the room interior heating.

During the room interior heating described above, an example is illustrated in which the first flow path switching valve 44 is controlled to the fully closed state such that the low-temperature heat medium does not pass through the battery cooling unit 42. However, the control mode during the room interior heating is not limited to this. The first flow path switching valve 44 may be controlled to the fully opened state by the controller 80 such that the low-temperature heat medium passes through the battery cooling unit 42 during the room interior heating.

According to this control, exhaust heat of the battery BT can be absorbed by the refrigerant in the device cooler 14 through the low-temperature heat medium. The exhaust heat of the battery BT can be thus used as a heat source for heating the ventilation air to be blown into the vehicle interior.

The refrigeration cycle device 10 described above has a cycle structure in which the liquid receiving portion 122, which stores the surplus refrigerant in the cycle, is provided in the refrigerant radiator 12. According to this configuration, the refrigerant states on the refrigerant outlet sides of the device cooler 14 and the air-conditioning cooler 16 can be brought into the superheated states during the room interior cooling and during the device cooling.

In addition, the first expansion valve 132 is controlled such that the refrigerant state on the refrigerant outlet side of the device cooler 14 is alternately changed to the superheated state and the wet state during the room interior heating. The refrigerant in the vapor-liquid two-phase state is thus drawn into the compressor 11 during the room interior heating. The oil in the cycle is therefore easily returned to the compressor along with the refrigerant.

In particular, the first expansion valve 132 is controlled such that the refrigerant state on the refrigerant outlet side of the device cooler 14 is alternately changed to the superheated state and the wet state during the room interior heating. As described above, the wet state, in which the refrigerant state is hardly identified, and the superheated state, in which the refrigerant state is easily identified, are alternately repeated. Dryness of the refrigerant in the wet state can be thus controlled not to become too low. Liquid compression in the compressor 11 can be therefore reduced.

According to the refrigeration cycle device 10 in accordance with the present embodiment, the oil can be thus returned to the refrigerant inlet side of the compressor 11 during the room interior heating without disposing an accumulator on the refrigerant inlet side of the compressor 11.

Specifically, in the fluctuation processing, the controller 80 reduces the throttle opening degree α of the first expansion valve 132 until the superheat degree Tsh of the refrigerant reaches the predetermined threshold temperature Tth. When the superheat degree Tsh of the refrigerant reaches the threshold temperature Tth, the controller 80 increases the throttle opening degree α of the first expansion valve 132 until the throttle opening degree α reaches the reference opening degree αth at which the refrigerant state becomes the wet state. When the throttle opening degree α of the first expansion valve 132 reaches the reference opening degree αth, the controller 80 reduces the throttle opening degree α of the first expansion valve 132 until the superheat degree Tsh of the refrigerant reaches the predetermined threshold temperature Tth. According to this control, the refrigerant state can be alternately switched between the superheated state and the wet state by changing the throttle opening degree α of the first expansion valve 132.

In the refrigeration cycle device 10, when the refrigerant state on the refrigerant outlet side of the device cooler 14 becomes the wet state (that is, the vapor-liquid two-phase state), a refrigerant position on the Mollier diagram cannot be found. The refrigerant state cannot be thus easily determined quantitatively.

In contrast, when the throttle opening degree α of the first expansion valve 132 is changed such that the refrigerant state is alternately switched between the superheated state and the wet state, variation in the superheat degree Tsh can be temporarily detected. The refrigerant state on the refrigerant outlet side of the device cooler 14 can be thus determined temporarily and quantitatively. According to this control, dryness of the refrigerant can be controlled not to become too low when the refrigerant state becomes wet state. Liquid compression in the compressor 11 can be thus reduced.

In the fluctuation processing, the controller 80 controls the first decompression unit 13 such that the variation in the throttle opening degree α per unit time is greater when the throttle opening degree α of the first expansion valve 132 is increased, than when the throttle opening degree α of the first expansion valve 132 is reduced. In this way, when the variation in the throttle opening degree α per unit time is increased while the throttle opening degree α of the first expansion valve 132 is increased, the flow of the refrigerant in the vapor-liquid two-phase state flowing into the side of the compressor 11 is facilitated. The oil in the cycle is therefore easily returned to the compressor 11 along with the refrigerant.

In the refrigeration cycle device 10, the refrigerant radiator 12 has the condensing portion 121 and the liquid receiving portion 122. The condensing portion 121 condenses the refrigerant. The liquid receiving portion 122 separates the refrigerant having passed through the condensing portion 121 into the vapor-phase and liquid-phase refrigerants, and stores the surplus liquid-phase refrigerant in the cycle.

Heat exchange performance of the device cooler 14 is thus easily exhibited in the configuration provided with the liquid receiving portion 122 on the high pressure side in the cycle (so-called receiver cycle), as compared to a configuration provided with a liquid receiving portion on the outlet side of the device cooler 14 (so-called accumulator cycle). In the refrigeration cycle device 10, the heat exchange performance of the device cooler 14 can be thus appropriately exhibited while oil accumulation in the device cooler 14 is reduced. In the accumulator cycle, the liquid receiving portion causes loss on the refrigerant inlet side of the compressor 11. The heat exchange performance of the device cooler 14 in the accumulator cycle thus becomes lower than that in the receiver cycle.

In particular, the refrigerant radiator 12 according to the present embodiment has the subcooling portion 123 that releases heat from the refrigerant having passed through the liquid receiving portion 122. According to this configuration, the refrigerant state on the refrigerant outlet side of the refrigerant radiator 12 becomes a subcooled state. Enthalpy on the refrigerant outlet side of the refrigerant radiator 12 is thus reduced. Even when the fluctuation processing is performed, the refrigerant having passed through the refrigerant radiator 12 can be therefore cooled to a liquid-phase refrigerant. That is, the refrigerant is subcooled through the subcooling portion 123, and thus undesirable fluctuation in a heat radiation capacity in the refrigerant radiator 12 due to the fluctuation processing can be reduced.

The evaporation pressure regulation valve 17 is disposed on a refrigerant flow downstream side of the air-conditioning cooler 16. The evaporation pressure regulation valve 17 is disposed for maintaining a pressure of the refrigerant on the outlet side of the air-conditioning cooler 16 higher than a pressure of the refrigerant on the outlet side of the device cooler 14. According to this configuration, for example, when the refrigerant flows through both the air-conditioning cooler 16 and the device cooler 14, temperatures of the refrigerants flowing through the air-conditioning cooler 16 and the device cooler 14 can be adjusted to temperatures suitable for the respective refrigerants.

The second decompression unit 15 of the refrigeration cycle device 10 includes the second on-off valve 151, which is configured to be fully closable. The controller 80 controls the second decompression unit 15 to be in a fully closed state during the room interior heating. The controller 80 thus controls the first decompression unit 13 such that the decompression effect is exhibited. According to this control, the refrigerant that has absorbed heat through the device cooler 14 is discharged toward the refrigerant radiator 12 through the compressor 11 during the room interior heating. The ventilation air to be blown into the vehicle interior can be thus heated using the refrigerant passing through the refrigerant radiator 12 as a heat source.

The device cooler 14 is a heat exchanger that exchanges heat between the refrigerant decompressed in the first decompression unit 13 and the low-temperature heat medium circulating in the low-temperature heat medium circuit 40. According to this configuration, the device cooler 14 can function as a cooler, during the device cooling, that cools the heat generating device using latent heat of evaporation obtained when the refrigerant absorbs heat from the low-temperature heat medium and thus evaporates. The device cooler 14 can function as a heat absorber, during the room interior heating, in which the refrigerant absorbs heat from the low-temperature heat medium. In addition, when the fluctuation processing is performed, an opportunity for the refrigerant in the wet state to pass through the entire portion of the device cooler 14 (that is, an opportunity to obtain latent heat of evaporation) is increased. Improvement can be thus expected in efficiency of absorption of heat from the low-temperature heat medium in the device cooler 14. In the refrigeration cycle device 10, the device cooler 14 is therefore preferably a heat exchanger that exchanges heat between the refrigerant and the heat medium. This configuration is not limited to a refrigeration cycle device 10 in which the device cooler 14 and the air-conditioning cooler 16 are connected in parallel, and the same applies to a refrigeration cycle device 10 in which the device cooler 14 is provided as an evaporator.

Modification of First Embodiment

In the first embodiment described above, an example is illustrated in which the fluctuation processing is performed by the controller 80 during the room interior heating. However, the timing of performing the fluctuation processing is not limited to this. The controller 80 may be, for example, configured to perform the fluctuation processing during the device cooling or during the room interior cooling.

The controller 80 may be further configured to perform the fluctuation processing, for example, when an oil shortage condition is satisfied during the room interior heating. For example, at least one of the following conditions 1 to 5 may be adopted as the oil shortage condition. The same applies to the following embodiments.

Condition 1

An oil shortage condition may be satisfied, for example, when an outside air temperature is lower than a predetermined reference outside air temperature (for example, a temperature lower than 0° C.). When the outside air temperature is low, a refrigerant evaporation pressure in the device cooler 14 is reduced, and a density of the refrigerant drawn into the compressor 11 is also reduced. Oil shortage may thus easily occur.

Condition 2

An oil shortage condition may be satisfied, for example, when a temperature of the refrigerant on the refrigerant outlet side of the device cooler 14 is lower than a reference refrigerant temperature (for example, a temperature lower than 0° C.). When the temperature of the refrigerant on the refrigerant outlet side of the device cooler 14 is low, the density of the refrigerant drawn into the compressor 11 is reduced. The oil shortage may thus easily occur.

Condition 3

An oil shortage condition may be satisfied, for example, when a pressure of the refrigerant on the refrigerant outlet side of the device cooler 14 is lower than a reference pressure. When the pressure of the refrigerant on the refrigerant outlet side of the device cooler 14 is low, the density of the refrigerant drawn into the compressor 11 is reduced. The oil shortage may thus easily occur.

Condition 4

An oil shortage condition may be satisfied, for example, when a rotational speed of the compressor 11 is lower than a reference rotational speed. When the rotational speed of the compressor 11 is lower than the reference rotational speed, a flow rate of the refrigerant circulating in the cycle becomes small. The oil shortage may thus easily occur.

Condition 5

An oil shortage condition may be satisfied, for example, when a predetermined reference time has elapsed since the completion of the fluctuation processing previously performed.

In the fluctuation processing of the first embodiment described above, an example is illustrated in which the throttle opening degree $\alpha$ of the first expansion valve 132 is increased immediately after the superheat degree Tsh of the refrigerant reaches the predetermined threshold temperature Tth. However, the fluctuation processing is not limited to this. The fluctuation processing may be, for example, processing in which the throttle opening degree $\alpha$ of the first expansion valve 132 is increased after the superheat degree Tsh of the refrigerant has reached the predetermined threshold temperature Tth and then a predetermined time has elapsed. In this case, the throttle opening degree $\alpha$ of the first expansion valve 132 is not changed until the predetermined time has elapsed.

In the fluctuation processing of the first embodiment described above, an example is illustrated in which the throttle opening degree $\alpha$ of the first expansion valve 132 is reduced immediately after the throttle opening degree $\alpha$ of the first expansion valve 132 reaches the reference opening degree $\alpha$th. However, the fluctuation processing is not limited to this. The fluctuation processing may be, for example, processing in which the throttle opening degree $\alpha$ of the first expansion valve 132 is reduced after a predetermined time has elapsed. The predetermined time is a time for the throttle opening degree $\alpha$ of the first expansion valve 132 to reach the reference opening degree $\alpha$th. In this case, the throttle opening degree $\alpha$ of the first expansion valve 132 is not changed until the predetermined time has elapsed.

Second Embodiment

Figure 8:
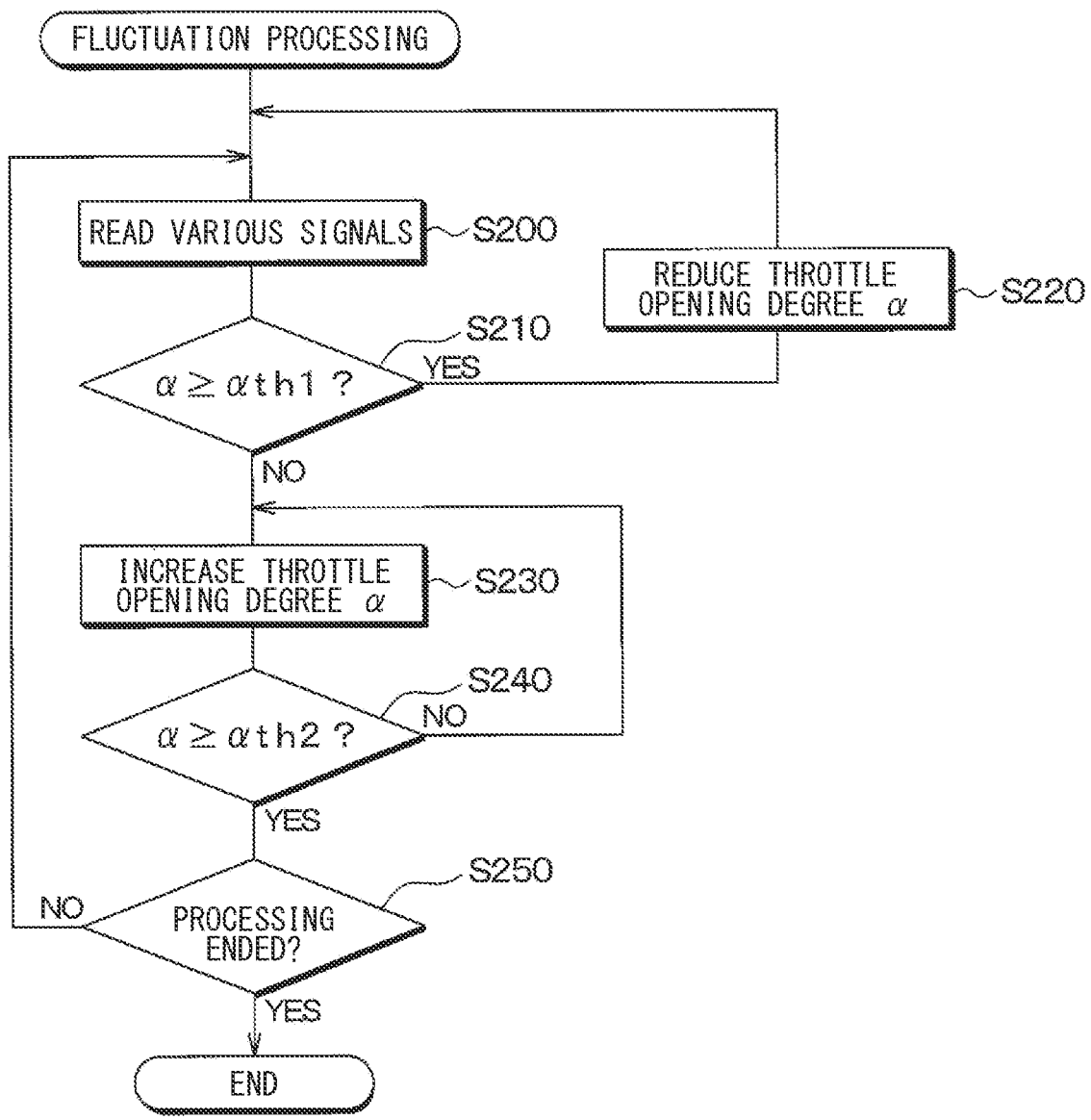
FIG. 8 is a flowchart illustrating a flow of control processing performed by a controller of a refrigeration cycle device according to a second embodiment.

Next, a second embodiment will be described with reference to FIG. 8. In the present embodiment, differences from the first embodiment will be mainly described. In a refrigeration cycle device 10 according to the present embodiment, content of fluctuation processing, which is performed by a controller 80, is different from that in the first embodiment.

The fluctuation processing according to the present embodiment will be described with reference to a flowchart in FIG. 8. As illustrated in FIG. 8, the controller 80 reads various signals input from a sensor group 81 and an operation panel 82 in step S200.

In step S210, the controller 80 determines whether a throttle opening degree $\alpha$ of a first expansion valve 132 is equal to or greater than a predetermined first reference opening degree $\alpha$th1. The first reference opening degree $\alpha$th1 is set to a throttle opening degree $\alpha$ at which a refrigerant state on the refrigerant outlet side of a device cooler 14 becomes a superheated state.

The throttle opening degree $\alpha$ leading to the superheated state can be predicted based on variation in a superheat degree when the throttle opening degree $\alpha$ of the first expansion valve 132 is reduced and variation in a superheat degree when the throttle opening degree $\alpha$ of the first expansion valve 132 is increased. Specifically, the first reference opening degree αth1 is set to a throttle opening degree α at which the refrigerant on the refrigerant outlet side of the device cooler 14 is predicted to have a reference superheat degree (for example, 2 to 4° C.). The first reference opening degree αth1 is set to, for example, a throttle opening degree α at which the threshold temperature Tth described in the first embodiment is predicted to be achieved. In this case, the first reference opening degree αth1 is a throttle opening degree α corresponding to the threshold temperature Tth. The first reference opening degree αth1 is set to an opening degree smaller than the reference opening degree αth described in the first embodiment.

When the throttle opening degree α of the first expansion valve 132 is equal to or greater than the first reference opening degree αth1 as a result of the determination processing in step S210, a first decompression unit 13 is controlled such that the throttle opening degree α of the first expansion valve 132 is reduced. The processing is then returned to step S200. Specifically, the controller 80 controls the stepping motor of the first expansion valve 132 such that the throttle opening degree α of the first expansion valve 132 is gradually reduced. That is, the controller 80 gradually reduces the throttle opening degree α of the first expansion valve 132 until the throttle opening degree α of the first expansion valve 132 reaches the first reference opening degree αth1.

When the throttle opening degree α of the first expansion valve 132 is smaller than the first reference opening degree αth1 as a result of the determination processing in step S210, the controller 80 proceeds to step S230. In step S230, the controller 80 controls the first decompression unit 13 such that the throttle opening degree α of the first expansion valve 132 is gradually increased. Specifically, the controller 80 controls the stepping motor of the first expansion valve 132 such that the throttle opening degree α of the first expansion valve 132 is gradually increased.

The controller 80 controls the first decompression unit 13 such that variation in a throttle opening degree α per unit time is greater when the throttle opening degree α of the first expansion valve 132 is increased, than when the throttle opening degree α of the first expansion valve 132 is reduced. Specifically, the controller 80 controls the stepping motor of the first expansion valve 132 such that variation in a throttle opening degree α per unit step is greater when the throttle opening degree α of the first expansion valve 132 is increased, than when the throttle opening degree α of the first expansion valve 132 is reduced. According to this control, the flow of the refrigerant in a vapor-liquid two-phase state flowing into the side of the compressor 11 is facilitated. The oil in the cycle is therefore easily returned to the compressor 11 along with the refrigerant.

In step S240, the controller 80 determines whether the throttle opening degree α of the first expansion valve 132 is equal to or greater than a predetermined second reference opening degree αth2. The second reference opening degree αth2 is a throttle opening degree α greater than the first reference opening degree αth1. The second reference opening degree αth2 is set to a throttle opening degree α at which the refrigerant state on the refrigerant outlet side of the device cooler 14 becomes a wet state. The second reference opening degree αth2 is set as an opening degree similar to the reference opening degree αth described in the first embodiment.

When the throttle opening degree α of the first expansion valve 132 is smaller than the second reference opening degree αth2 as a result of the determination processing in step S240, the controller 80 returns to step S230. That is, the controller 80 increases the throttle opening degree α of the first expansion valve 132 until the throttle opening degree α of the first expansion valve 132 reaches the second reference opening degree αth2.

When the throttle opening degree α of the first expansion valve 132 is equal to or greater than the second reference opening degree αth2 as a result of the determination processing in step S240, the controller 80 proceeds to step S250. In step S250, the controller 80 determines whether an end condition of the fluctuation processing is satisfied. The end condition of the fluctuation processing is, for example, a condition that is satisfied when the operation of the air conditioner 1 that performs the room interior heating is stopped.

When the end condition of the fluctuation processing is satisfied as a result of the determination processing in step S250, the controller 80 ends the fluctuation processing. When the end condition of the fluctuation processing is not satisfied, the controller 80 returns to step S200.

Other configurations and operations are the same as those in the first embodiment. In the refrigeration cycle device 10 according to the present embodiment, effects achieved by the configuration common to or equivalent to that of the first embodiment can be obtained in the same manner as in the first embodiment.

In the fluctuation processing of the present embodiment, the controller 80 reduces the throttle opening degree α of the first expansion valve 132 until the throttle opening degree α of the first expansion valve 132 reaches the first reference opening degree αth1 at which the superheat degree Tsh of the refrigerant becomes a value equal to or higher than the predetermined threshold temperature Tth. When the throttle opening degree α of the first expansion valve 132 reaches the first reference opening degree αth1, the controller 80 increases the throttle opening degree α of the first expansion valve 132 until the throttle opening degree α of the first expansion valve 132 reaches the second reference opening degree αth2 at which the refrigerant state becomes the wet state. When the throttle opening degree α of the first expansion valve 132 reaches the second reference opening degree αth2, the controller 80 reduces the throttle opening degree α of the first expansion valve 132 until the throttle opening degree α of the first expansion valve 132 reaches the first reference opening degree αth1. According to this control, the refrigerant state can be also alternately switched between the superheated state and the wet state by changing the throttle opening degree α of the first expansion valve 132.

Modification of Second Embodiment

In the fluctuation processing of the second embodiment described above, an example is illustrated in which the throttle opening degree α of the first expansion valve 132 is increased immediately after the throttle opening degree α of the first expansion valve 132 reaches the first reference opening degree αth1. However, the fluctuation processing is not limited to this. The fluctuation processing may be, for example, processing in which the throttle opening degree α of the first expansion valve 132 is increased after the throttle opening degree α of the first expansion valve 132 has reached the first reference opening degree αth1 and then a predetermined time has elapsed. In this case, the throttle opening degree α of the first expansion valve 132 is not changed until the predetermined time has elapsed. This control may also apply when the throttle opening degree α of the first expansion valve 132 reaches the second reference opening degree αth2.

Third Embodiment

Figure 9:
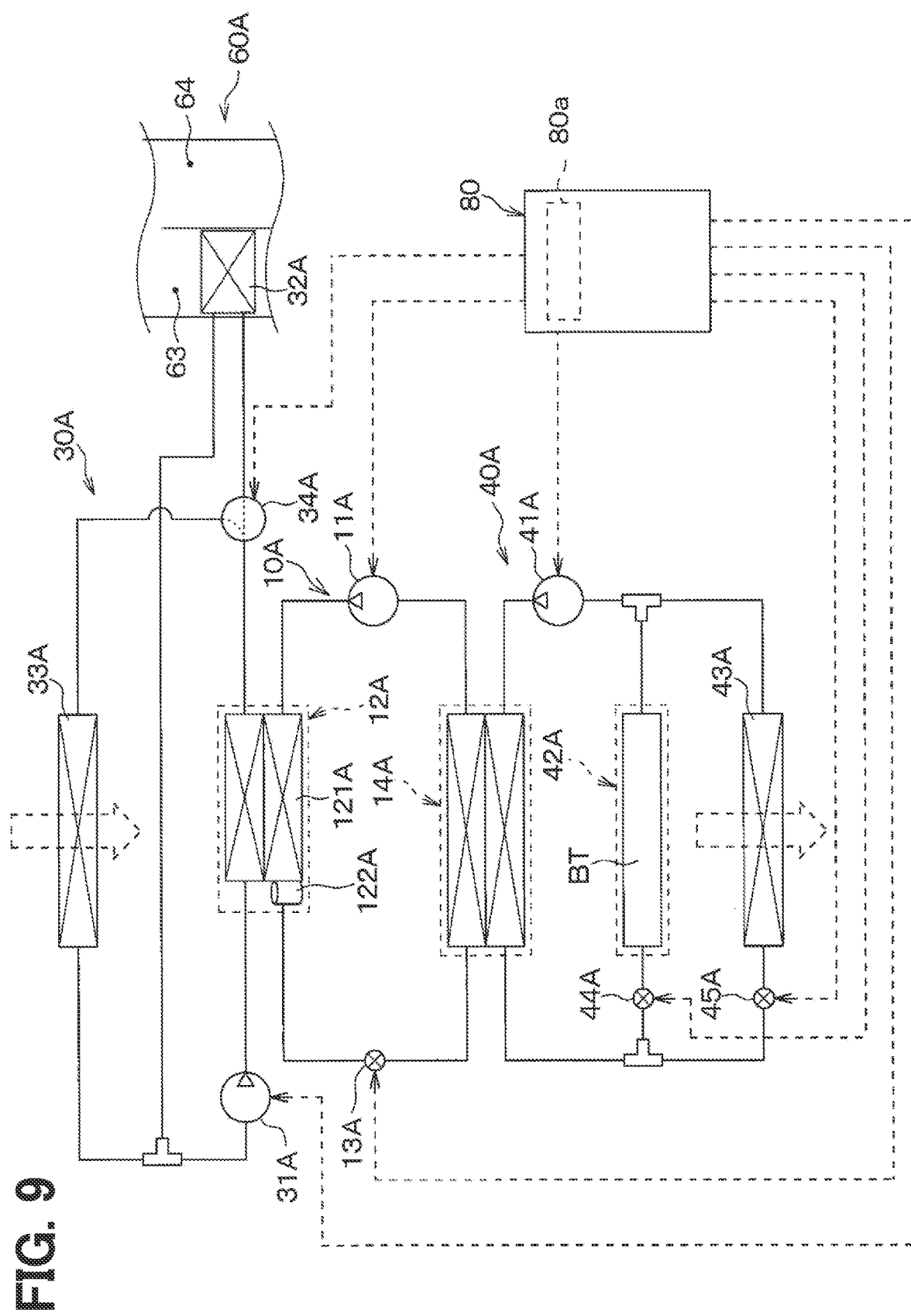
FIG. 9 is a diagram illustrating a schematic configuration of a device cooling system including a refrigeration cycle device according to a third embodiment.

Next, a third embodiment will be described with reference to FIGS. 9 and 10. In the present embodiment, differences from the first embodiment will be mainly described.

In the present embodiment, an example will be described in which a refrigeration cycle device 10A according to the present disclosure is applied to a device cooling system, which is used for cooling a battery BT that is a heat generating device. The refrigeration cycle device 10A illustrated in FIG. 9 can perform device cooling and room interior heating.

The refrigeration cycle device 10A includes a compressor 11A, a refrigerant radiator 12A, a decompression unit 13A, a device cooler 14A, and a controller 80. In a refrigerant circuit 100 of the refrigeration cycle device 10A, the compressor 11A, the refrigerant radiator 12A, the decompression unit 13A, and the device cooler 14A are arranged in this order. The compressor 11A is configured similarly to the compressor 11 described in the first embodiment.

The refrigerant radiator 12A releases heat from a refrigerant discharged from the compressor 11A. The refrigerant radiator 12A is a heat exchanger that releases heat from the high-pressure refrigerant discharged from the compressor 11A to a high-temperature heat medium flowing through a high-temperature heat medium circuit 30A. Specifically, the refrigerant radiator 12A has a condensing portion 121A and a liquid receiving portion 122A. The condensing portion 121A condenses the refrigerant. The liquid receiving portion 122A separates the refrigerant having passed through the condensing portion 121A into vapor-phase and liquid-phase refrigerants, and stores a surplus liquid-phase refrigerant in the cycle. The condensing portion 121A and the liquid receiving portion 122A are configured similarly to those described in the first embodiment.

Similarly to the first embodiment, the high-temperature heat medium circuit 30A includes the refrigerant radiator 12A, a high-temperature side pump 31A, a heater core 32A, a high-temperature side radiator 33A, a high-temperature side flow-rate regulation valve 34A, and other components. The high-temperature side pump 31A, the heater core 32A, the high-temperature side radiator 33A, and the high-temperature side flow-rate regulation valve 34A are configured similarly to those described in the first embodiment.

The decompression unit 13A is connected to an outlet side of the refrigerant radiator 12A. The decompression unit 13A is an expansion valve that decompresses the refrigerant having passed through the refrigerant radiator 12A. The decompression unit 13A is configured similarly to the first expansion valve 132 described in the first embodiment.

The device cooler 14A is an evaporator that evaporates the refrigerant by exchanging heat between the refrigerant decompressed in the decompression unit 13A and a low-temperature heat medium circulating in a low-temperature heat medium circuit 40A. The device cooler 14A functions as a cooler, during the device cooling, that cools the battery BT, using latent heat of evaporation of the refrigerant decompressed in the decompression unit 13A. The device cooler 14A also functions as a heat absorber during the room interior heating.

Similarly to the first embodiment, the low-temperature heat medium circuit 40A includes the device cooler 14A, a low-temperature side pump 41A, a battery cooling unit 42A, a low-temperature side radiator 43A, a first flow path switching valve 44A, a second flow path switching valve 45A, and other components. The low-temperature side pump 41A, the battery cooling unit 42A, the low-temperature side radiator 43A, the first flow path switching valve 44A, and the second flow path switching valve 45A are configured similarly to those described in the first embodiment.

Hereinafter, operation of the device cooling system will be described. The device cooling system is configured to be able to perform operation modes including the device cooling and the room interior heating.

Device Cooling

The device cooling is an operation mode in which the battery BT, which is a heat generating device, is cooled using latent heat of evaporation of the refrigerant. The controller 80 appropriately determines operation states of various devices during the device cooling using detection signals from a sensor group 81 and an operation signal from an operation panel 82.

As illustrated in FIG. 10, the controller 80, for example, controls the decompression unit 13A to be in a variable throttle state. That is, the controller 80 controls the decompression unit 13A such that a refrigerant state on a refrigerant outlet side of the device cooler 14A becomes a superheated state having a superheat degree during the device cooling.

In the refrigeration cycle device 10A during the device cooling, the high-pressure refrigerant discharged from the compressor 11A thus flows into the condensing portion 121A of the refrigerant radiator 12A. The refrigerant having flowed into the condensing portion 121A releases heat to the high-temperature heat medium flowing through the high-temperature heat medium circuit 30A, and thus condenses.

The refrigerant having passed through the condensing portion 121A flows into the liquid receiving portion 122A and is separated into the vapor-phase and liquid-phase refrigerants. The liquid-phase refrigerant separated in the liquid receiving portion 122A then flows into the decompression unit 13A, and is decompressed in the decompression unit 13A.

The refrigerant decompressed in the decompression unit 13A flows into the device cooler 14A. The refrigerant having flowed into the device cooler 14A absorbs heat from the low-temperature heat medium flowing through the low-temperature heat medium circuit 40A, and thus evaporates. The low-temperature heat medium is therefore cooled.

A throttle opening degree α of the decompression unit 13A is set such that the refrigerant state on the refrigerant outlet side of the device cooler 14A becomes the superheated state during the device cooling. The refrigerant having passed through the device cooler 14A thus becomes a vapor-phase refrigerant having a superheat degree, and is drawn into the compressor 11A. The refrigerant drawn into the compressor 11A is compressed again in the compressor 11A until the refrigerant becomes a high-pressure refrigerant.

The low-temperature heat medium cooled by the device cooler 14A flows into the battery cooling unit 42A and absorbs heat from the battery BT. The battery BT is therefore cooled. That is, the battery BT is cooled using latent heat of evaporation of the refrigerant in the device cooler 14A during the device cooling.

As described above, the battery BT can be cooled by supplying the low-temperature heat medium cooled through the device cooler 14A to the battery cooling unit 42A during the device cooling.

Room Interior Heating (Vehicle Interior Heating)

The room interior heating is an operation mode in which air heated to a desired temperature through a vehicle interior air-conditioning unit 60A is blown into the vehicle interior. The controller 80 appropriately determines operation states of various devices during the room interior heating using detection signals from the sensor group 81 and an operation signal from the operation panel 82.

As illustrated in FIG. 10, the controller 80, for example, performs fluctuation processing in which the throttle opening degree α of the decompression unit 13A is changed such that the refrigerant state on the refrigerant outlet side of the device cooler 14A is alternately changed to a superheated state having a superheat degree α nd a wet state containing wet vapor. That is, the controller 80 controls the decompression unit 13A similarly to the first decompression unit 13 of the first embodiment during the room interior heating.

In the refrigeration cycle device 10A during the room interior heating, the high-pressure refrigerant discharged from the compressor 11A thus flows into the condensing portion 121A of the refrigerant radiator 12A. The refrigerant having flowed into the condensing portion 121A releases heat to the high-temperature heat medium flowing through the high-temperature heat medium circuit 30A, and thus condenses. The high-temperature heat medium flowing through the high-temperature heat medium circuit 30A is thus heated, and a temperature of the high-temperature heat medium therefore increases.

The high-temperature heat medium heated through the condensing portion 121A flows into the heater core 32A and releases heat to ventilation air to be blown into the vehicle interior. That is, heat of the high-pressure refrigerant in the cycle is released to the ventilation air to be blown into the vehicle interior through the high-temperature heat medium during the room interior heating.

The refrigerant having passed through the condensing portion 121A flows into the liquid receiving portion 122A and is separated into the vapor-phase and liquid-phase refrigerants. The liquid-phase refrigerant separated in the liquid receiving portion 122A then flows into the decompression unit 13A, and is decompressed in the decompression unit 13A.

The refrigerant decompressed in the decompression unit 13A flows into the device cooler 14A. The refrigerant having flowed into the device cooler 14A absorbs heat from the low-temperature heat medium flowing through the low-temperature heat medium circuit 40A and thus evaporates. The low-temperature heat medium is therefore cooled. The low-temperature heat medium cooled through the device cooler 14A flows into the low-temperature side radiator 43A and absorbs heat from outside air.

The throttle opening degree α of the decompression unit 13A is changed such that the refrigerant state on the refrigerant outlet side of the device cooler 14A is alternately changed to the superheated state and the wet state during the room interior heating. The refrigerant having passed through the device cooler 14A thus becomes a refrigerant in a vapor-liquid two-phase state and is drawn into the compressor 11A. The refrigerant drawn into the compressor 11A is compressed again in the compressor 11A until the refrigerant becomes a high-pressure refrigerant.

As a result, the vehicle interior can be heated by blowing the ventilation air heated through the heater core 32A into the vehicle interior during the room interior heating. The oil in the device cooler 14A is returned to the compressor 11A along with the liquid-phase refrigerant during the room interior heating.

The refrigeration cycle device 10A according to the present embodiment has a configuration common to that of the first embodiment. Effects achieved by the configuration common to that of the first embodiment can be therefore obtained in the same manner as in the first embodiment. That is, in the refrigeration cycle device 10A according to the present embodiment, the decompression unit 13A is controlled such that the refrigerant state on the refrigerant outlet side of the device cooler 14A is alternately changed to the superheated state and the wet state, at least during the room interior heating. According to this control, when the refrigerant state on the refrigerant outlet side of the device cooler 14A becomes the wet state, the refrigerant in the vapor-liquid two-phase state is drawn into the compressor 11A, at least during the room interior heating. The oil in the cycle is therefore easily returned to the compressor 11A along with the refrigerant. The wet state and the superheated state are alternately repeated. Dryness of the refrigerant in the wet state can be thus controlled not to become too low. Liquid compression in the compressor 11A can be therefore reduced.

According to the refrigeration cycle device 10A in accordance with the present embodiment, the oil can be thus returned to a refrigerant inlet side of the compressor 11A during the room interior heating without disposing an accumulator on the refrigerant inlet side of the compressor 11A.

In the refrigeration cycle device 10A, the refrigerant radiator 12A has the condensing portion 121A and the liquid receiving portion 122A. The condensing portion 121A condenses the refrigerant. The liquid receiving portion 122A separates the refrigerant having passed through the condensing portion 121A into the vapor-phase and liquid-phase refrigerants, and stores the surplus liquid-phase refrigerant in the cycle. In the refrigeration cycle device 10A, heat exchange performance of the device cooler 14A can be thus appropriately exhibited while oil accumulation in the device cooler 14A is reduced. The refrigeration cycle device 10A has a cycle structure in which the refrigerant radiator 12A is provided with the liquid receiving portion 122A that stores the surplus refrigerant in the cycle. The refrigerant state on the refrigerant outlet side of the device cooler 14A can be thus brought into the superheated state during the device cooling.

Other Embodiments

The typical embodiments according to the present disclosure have been described above. However, the present disclosure is not limited to the above embodiments, and can be variously modified as follows, for example.

In the above embodiments, an example is illustrated in which the fluctuation processing is unconditionally performed during the room interior heating. However, the controller 80 may be adapted to perform processing of determining whether the fluctuation processing is performed. The controller 80 may be, for example, adapted to perform determination processing in which the controller 80 determines whether the fluctuation processing is performed based on a state of the battery BT.

In the above embodiments, an example is illustrated for the fluctuation processing. Specifically, the first decompression unit 13 is controlled such that the variation in the throttle opening degree α per unit time is greater when the throttle opening degree α of the first expansion valve 132 is increased, than when the throttle opening degree α of the first expansion valve 132 is reduced. However, the fluctuation processing is not limited to this. The fluctuation processing may be, for example, processing in which the first decompression unit 13 is controlled such that the variation in the throttle opening degree α per unit time is constant.

In the above embodiments, an example is illustrated for the fluctuation processing. Specifically, the throttle opening degree α of the first expansion valve 132 is changed in accordance with the superheat degree Tsh of the refrigerant or the throttle opening degree α of the first expansion valve 132. However, a factor for changing the throttle opening degree α of the first expansion valve 132 is not limited to this.

The fluctuation processing may be, for example, processing in which the throttle opening degree α of the first expansion valve 132 is changed based on a time, as the factor, during which the throttle opening degree α is changed, as long as the refrigerant state on the refrigerant outlet side of the device cooler 14 is alternately changed to the superheated state and the wet state.

The fluctuation processing may be, for example, processing in which the first decompression unit 13 is controlled such that the throttle opening degree α of the first expansion valve 132 is increased or reduced within a preset allowable range. The allowable range in this case may be set as a throttle range with an upper limit and a lower limit such that at throttle opening degrees a between the upper limit and the lower limit, a refrigerant state becomes a saturated state.

In the above embodiments, an example of the refrigeration cycle device 10 is illustrated that can perform the room interior cooling, the device cooling, and the room interior heating. However, the refrigeration cycle device 10 is not limited to this. The refrigeration cycle device 10 may be configured to be able to perform dehumidification heating of the vehicle interior, for example. The refrigeration cycle device 10 may be configured to be able to perform only the room interior heating, for example.

The configurations of the refrigeration cycle device 10 described in the above embodiments are not limited to those disclosed in the above embodiments. The compressor 11 may be, for example, a compressor that is driven by an internal combustion engine. The refrigerant radiator 12 may be configured to include only the condensing portion 121 without the liquid receiving portion 122 and the subcooling portion 123, for example. The second expansion valve 152 may be configured by, for example, a mechanical expansion valve or a fixed throttle. The first on-off valve 131 and the second on-off valve 151 may be, for example, disposed on a downstream side of the first expansion valve 132 and on a downstream side of the second expansion valve 152, respectively. The first on-off valve 131 and the second on-off valve 151 may be, for example, disposed in parallel with the first expansion valve 132 and the second expansion valve 152, respectively. The first decompression unit 13 and the second decompression unit 15 may be electric expansion valves having a fully closable function. The evaporation pressure regulation valve 17 need not be disposed in the third refrigerant flow path 100c, but may be disposed in the second refrigerant flow path 100b, for example.

In the above embodiments, an example is illustrated in which a liquid such as an antifreezing fluid is used for each of the high-temperature heat medium and the low-temperature heat medium. However, the high-temperature heat medium and the low-temperature heat medium are not limited to this. A gas may be used for each of the high-temperature heat medium and the low-temperature heat medium, as long as the high-temperature heat medium and the low-temperature heat medium have excellent heat conductivity.

Each of the configurations in the high-temperature heat medium circuit 30 described in the above embodiments is not limited to that disclosed in the above embodiments. The high-temperature heat medium circuit 30 may be, for example, configured such that the ratio between the flow rates of the portion of the refrigerant flowing into the heater core 32 and the portion of the refrigerant flowing into the high-temperature side radiator 33 is regulated by two flow-rate regulation valves. In this case, one flow-rate regulation valve is provided for the heater core 32, and the other flow-rate regulation valve is provided for the high-temperature side radiator 33.

Each of the configurations in the low-temperature heat medium circuit 40 described in the above embodiments is not limited to that disclosed in the above embodiments. The low-temperature heat medium circuit 40 may be configured such that a flow path switching valve of a three-way valve type switches the flow paths.

The device cooled by the low-temperature heat medium flowing through the low-temperature heat medium circuit 40 may be a device other than the battery BT, as long as the device is a heat generating device that generates heat during operation. Besides the battery BT, examples of heat generating devices mounted on the vehicle include an electric motor for outputting a driving force for vehicle traveling, an inverter for converting a frequency of power to be supplied to the electric motor, a charger for charging the battery BT, and other devices. The low-temperature heat medium circuit 40 may be thus configured to cool not only the battery BT but also the electric motor, the inverter, the charger, and other devices. This configuration can be achieved by connecting the various heat generating devices in parallel or in series, with respect to the flow of the low-temperature heat medium.

In the above embodiments, a relationship between the high-temperature side radiator 33 and the low-temperature side radiator 43 is not mentioned. However, the relationship between the high-temperature side radiator 33 and the low-temperature side radiator 43 is not limited to the relationship in which the high-temperature side radiator 33 and the low-temperature side radiator 43 are independent of each other. The high-temperature side radiator 33 and the low-temperature side radiator 43 may be, for example, integrated such that the high-temperature heat medium and the low-temperature heat medium can transfer heat to each other. Specifically, the high-temperature side radiator 33 and the low-temperature side radiator 43 may have some common components (for example, heat exchange fins). The high-temperature side radiator 33 and the low-temperature side radiator 43 may be thus integrated such that the heat media can transfer heat to each other.

In the above embodiments, an example is illustrated in which the refrigeration cycle device 10, 10A is applied to the air conditioner 1 and the device cooling system of the hybrid vehicle. However, the application of the refrigeration cycle device 10, 10A is not limited to this. The refrigeration cycle device 10, 10A is applicable to, for example, an air conditioner 1 and a device cooling system of an electric vehicle. The refrigeration cycle device 10, 10A is applicable not only to a moving body such as a vehicle but also to a stationary device or system.

In the above embodiments, it goes without saying that the components constituting the embodiments are not necessarily indispensable unless otherwise clearly stated or unless otherwise thought to be clearly indispensable in principle.

In the above embodiments, when a numerical value such as the number, a numerical value, an amount, or a range of the component of the embodiment is mentioned, the numerical value is not limited to the specified number unless otherwise specified to be indispensable or clearly limited to the specified number in principle.

In the above embodiments, when a shape, a positional relationship, or the like of the component or the like is mentioned, the shape, the positional relationship, or the like is not limited to that being mentioned unless otherwise specified or limited to a specified shape, a specified positional relationship, or the like in principle.

In the above embodiments, when it is described that outside environment information (for example, outside air temperature) of a vehicle is acquired from a sensor, the sensor may be abolished and the outside environment information may be received from a server or the cloud outside the vehicle. Alternatively, the sensor may be abolished and information related to the outside environment information may be acquired from the server or the cloud outside the vehicle. The outside environment information may be then estimated from the acquired related information.

The control unit and the method thereof described in the present disclosure may be implemented by a dedicated computer provided by including a processor and a memory programmed to execute one or more functions embodied by a computer program. Alternatively, the control unit and the method thereof described in the present disclosure may be implemented by a dedicated computer provided by including a processor with one or more dedicated hardware logic circuits. Alternatively, the control unit and the method thereof described in the present disclosure may be implemented by one or more dedicated computers configured by a combination of a processor and a memory programmed to execute one or more functions, and a processor with one or more hardware logic circuits. The computer program may be stored in a computer-readable non-transitory tangible storage medium as an instruction to be executed by the computer.

Overview

According to a first aspect described in part or all of the above embodiments, a refrigeration cycle device includes a compressor, a refrigerant radiator, a refrigerant decompression unit, an evaporator, and a controller. An opening degree control unit of the controller controls the refrigerant decompression unit. The opening degree control unit of the controller performs, at least during the room interior heating, a fluctuation operation (i.e., fluctuation processing) in which the throttle opening degree of the refrigerant decompression unit is changed such that the refrigerant state on the refrigerant outlet side of the evaporator is alternately changed to a superheated state having a superheat degree and a wet state containing the wet vapor.

According to a second aspect, a refrigeration cycle device includes a compressor, a refrigerant radiator, a refrigerant decompression unit, a parallel decompression unit, a device cooler, an air-conditioning cooler, and a controller. An opening degree control unit of the controller controls the refrigerant decompression unit and the parallel decompression unit. The opening degree control unit performs, at least during the room interior heating, a fluctuation operation (fluctuation processing) in which the throttle opening degree of the refrigerant decompression unit is changed such that the refrigerant state on the refrigerant outlet side of the device cooler is alternately changed to the superheated state having the superheat degree and the wet state containing the wet vapor.

According to a third aspect, the refrigeration cycle device may include a pressure regulation valve disposed on the refrigerant flow downstream side of the air-conditioning cooler. The pressure regulation valve is disposed for maintaining the pressure of the refrigerant on the outlet side of the air-conditioning cooler higher than the pressure of the refrigerant on the outlet side of the device cooler. According to this configuration, for example, when the refrigerant flows through both the air-conditioning cooler and the device cooler, temperatures of the refrigerants flowing through the air-conditioning cooler and the device cooler can be adjusted to temperatures suitable for the respective refrigerants.

According to a fourth aspect, in the fluctuation operation, the throttle opening degree of the refrigerant decompression unit is reduced until the superheat degree of the refrigerant reaches a predetermined threshold temperature. In the fluctuation operation, when the superheat degree of the refrigerant reaches the threshold temperature, the throttle opening degree of the refrigerant decompression unit is increased until the throttle opening degree reaches the reference opening degree at which the refrigerant state becomes the wet state. In the fluctuation operation, when the throttle opening degree of the refrigerant decompression unit reaches the reference opening degree, the throttle opening degree of the refrigerant decompression unit is reduced until the superheat degree of the refrigerant reaches the threshold temperature. According to this control, the refrigerant state can be alternately switched between the superheated state and the wet state by changing the throttle opening degree of the refrigerant decompression unit.

According to a fifth aspect, in the fluctuation operation, the throttle opening degree of the refrigerant decompression unit is reduced until the throttle opening degree reaches a first reference opening degree at which the superheat degree of the refrigerant becomes a value equal to or higher than the predetermined threshold temperature. In the fluctuation processing, when the throttle opening degree of the refrigerant decompression unit reaches the first reference opening degree, the throttle opening degree of the refrigerant decompression unit is increased until the throttle opening degree reaches a second reference opening degree at which the refrigerant state becomes the wet state. In the fluctuation operation, when the throttle opening degree of the refrigerant decompression unit reaches the second reference opening degree, the throttle opening degree of the refrigerant decompression unit is reduced until the throttle opening degree of the refrigerant decompression unit reaches the first reference opening degree. According to this control, the refrigerant state can be alternately switched between the superheated state and the wet state by changing the throttle opening degree of the refrigerant decompression unit.

According to a sixth aspect, in the fluctuation operation, the opening degree control unit controls the refrigerant decompression unit such that the variation in the throttle opening degree per unit time is greater when the throttle opening degree of the refrigerant decompression unit is increased, than that when the throttle opening degree of the refrigerant decompression unit is reduced. In this way, the variation in the throttle opening degree per unit time is increased when the throttle opening degree of the refrigerant decompression unit is increased. The flow of the refrigerant in the vapor-liquid two-phase state flowing into the compressor can be thus facilitated, and the oil in the cycle is therefore easily returned to the compressor along with the refrigerant.

According to a seventh aspect, the refrigerant radiator has a condensing portion and a liquid receiving portion. The condensing portion condenses the refrigerant. The liquid receiving portion separates the refrigerant having passed through the condensing portion into the vapor-phase and liquid-phase refrigerants, and stores the surplus liquid-phase refrigerant in the cycle. As described above, heat exchange performance of the evaporator or the device cooler is more easily exhibited in the configuration provided with the liquid receiving portion on the high pressure side in the cycle (so-called receiver cycle), as compared to a configuration provided with a liquid receiving portion on the outlet side of the evaporator and the device cooler (so-called accumulator cycle). According to the present aspect, the heat exchange performance of the evaporator or the device cooler can be thus appropriately exhibited while oil accumulation in the evaporator or the device cooler is reduced. In the accumulator cycle, the liquid receiving portion causes loss on the refrigerant inlet side of the compressor. The heat exchange performance of the evaporator or the device cooler in the accumulator cycle is thus lower than that in the receiver cycle.

According to an eighth aspect, the refrigerant radiator further has a subcooling portion that releases heat from the refrigerant having passed through the liquid receiving portion. According to this configuration, even when the fluctuation operation is performed, the refrigerant having passed through the refrigerant radiator can be cooled to a liquid-phase refrigerant. That is, the refrigerant is subcooled through the subcooling portion, and thus undesirable fluctuation in a heat radiation capacity in the refrigerant radiator due to the fluctuation processing can be reduced.

According to a ninth aspect, the evaporator is a heat exchanger that exchanges heat between the refrigerant decompressed in the refrigerant decompression unit and the heat medium circulating in the heat medium circuit. According to this configuration, the evaporator can function as a heat absorber in which the refrigerant absorbs heat from the heat medium during the room interior heating. When the fluctuation operation is performed, an opportunity for the refrigerant in the wet state to pass through the entire portion of the evaporator (that is, an opportunity to obtain latent heat of evaporation) is increased. Improvement can be thus expected in efficiency of absorption of heat from the heat medium in the evaporator. In the refrigeration cycle device according to the present disclosure, the evaporator is thus preferably a heat exchanger that exchanges heat between the refrigerant and the heat medium.

According to a tenth aspect, the device cooler is a heat exchanger that exchanges heat between the refrigerant decompressed in the refrigerant decompression unit and the heat medium circulating in the heat medium circuit. According to this configuration, the device cooler can function as a cooler, during the device cooling, that cools the heat generating device, using latent heat of evaporation obtained when the refrigerant absorbs heat from the heat medium and thus evaporates. The device cooler can also function as a heat absorber, during the room interior heating, in which the refrigerant absorbs heat from the heat medium. When the fluctuation operation is performed, the opportunity for the refrigerant in the wet state to pass through the entire portion of the device cooler (that is, the opportunity to obtain latent heat of evaporation) is increased. Improvement can be thus expected in efficiency of absorption of heat from the heat medium in the device cooler. In the refrigeration cycle device according to the present disclosure, the device cooler is thus preferably a heat exchanger that exchanges heat between the refrigerant and the heat medium.

What is claimed is:

1. A refrigeration cycle device capable of performing a room interior heating in which ventilation air to be blown into a space to be air conditioned is heated, the refrigeration cycle device comprising:
    a compressor configured to compress and discharge a refrigerant containing oil;
    a refrigerant radiator configured to heat the ventilation air using the refrigerant discharged from the compressor as a heat source during the room interior heating;
    a refrigerant decompression unit configured to decompress the refrigerant having passed through the refrigerant radiator;
    an evaporator configured to evaporate the refrigerant and to function as a heat absorber during the room interior heating; and
    a controller configured to control a throttle opening degree of the refrigerant decompression unit, wherein
    the controller is configured to perform, at least during the room interior heating, a fluctuation operation in which the throttle opening degree of the refrigerant decompression unit is changed and a refrigerant state on a refrigerant outlet side of the evaporator is alternately changed to a superheated state having a superheat degree and a wet state containing wet vapor.

2. The refrigeration cycle device according to claim 1, wherein the evaporator is a heat exchanger that exchanges heat between the refrigerant decompressed in the refrigerant decompression unit and a heat medium circulating in a heat medium circuit.

3. The refrigeration cycle device according to claim 1, wherein
    the controller is configured to perform the fluctuation operation to have;
    (i) a first state in which the throttle opening degree of the refrigerant decompression unit is reduced until the superheat degree of the refrigerant on the refrigerant outlet side of the evaporator reaches a threshold temperature;
    (ii) a second state in which the throttle opening degree of the refrigerant decompression unit is increased until the throttle opening degree of the refrigerant decompression unit reaches a reference opening degree at which the refrigerant state becomes the wet state, in response to that the superheat degree of the refrigerant on the refrigerant outlet side of the evaporator reaches the threshold temperature in the first state; and
    (iii) a third state in which the throttle opening degree of the refrigerant decompression unit is reduced again until the superheat degree of the refrigerant on the refrigerant outlet side of the evaporator reaches the threshold temperature, in response to that the throttle opening degree of the refrigerant decompression unit reaches the reference opening degree in the second state.

4. The refrigeration cycle device according to claim 1, wherein the controller is configured to perform the fluctuation operation to have:
    (i) a first state in which the throttle opening degree of the refrigerant decompression unit is reduced until the throttle opening degree of the refrigerant decompression unit reaches a first reference opening degree at which the superheat degree of the refrigerant on the refrigerant outlet side of the evaporator becomes a value equal to or higher than a predetermined threshold temperature;

(ii) a second state in which the throttle opening degree of the refrigerant decompression unit is increased until the throttle opening degree of the refrigerant decompression unit reaches a second reference opening degree at which the refrigerant state becomes the wet state, in response to that the throttle opening degree of the refrigerant decompression unit reaches the first reference opening degree; and (iii) a third state in which the throttle opening degree of the refrigerant decompression unit is reduced again until the throttle opening degree of the refrigerant decompression unit reaches the first reference opening degree, in response to that the throttle opening degree of the refrigerant decompression unit reaches the second reference opening degree.

5. The refrigeration cycle device according to claim 1, wherein
the controller controls the refrigerant decompression unit to perform the fluctuation operation in which a variation in the throttle opening degree per unit time is greater when the throttle opening degree of the refrigerant decompression unit is increased, than that when the throttle opening degree of the refrigerant decompression unit is reduced.

6. The refrigeration cycle device according to claim 1, wherein
the refrigerant radiator includes a condensing portion in which the refrigerant is condensed, and a liquid receiving portion in which the refrigerant having passed through the condensing portion is cooled and condensed into a vapor-phase refrigerant and a liquid-phase refrigerant to store therein a surplus liquid-phase refrigerant in the cycle.

7. The refrigeration cycle device according to claim 6, wherein the refrigerant radiator further includes a subcooling portion that releases heat from the refrigerant having passed through the liquid receiving portion.

8. A refrigeration cycle device capable of performing a room interior heating in which ventilation air to be blown into a space to be air conditioned is heated, a device cooling in which a heat generating device is cooled, and a room interior cooling in which the ventilation air is cooled, the refrigeration cycle device comprising:
a compressor configured to compress and discharge a refrigerant containing oil;
a refrigerant radiator configured to heat the ventilation air to be blown into the space to be air conditioned using the refrigerant discharged from the compressor as a heat source during the room interior heating;
a refrigerant decompression valve configured to decompress the refrigerant having passed through the refrigerant radiator;
a parallel decompression valve disposed in parallel with the refrigerant decompression valve on a downstream side of the refrigerant radiator in a refrigerant flow;
a heat exchanger disposed to exchange heat between the refrigerant decompressed in the refrigerant decompression valve and a thermal medium of a thermal medium circuit, the heat exchanger being configured to cool the heat generating device via the thermal medium by using latent heat of evaporation of the refrigerant decompressed in the refrigerant decompression valve during the device cooling, and to function as a heat absorber during the room interior heating;
an air-conditioning cooler configured to cool the ventilation air using the latent heat of evaporation of the refrigerant decompressed in the parallel decompression valve; and
a controller configured to control a throttle opening degree of the refrigerant decompression valve and a throttle opening degree of the parallel decompression valve, wherein
the controller is configured to perform, at least during the room interior heating, a fluctuation operation in which the throttle opening degree of the refrigerant decompression valve is changed and a refrigerant state on a refrigerant outlet side of the device cooler heat exchanger is alternately changed to a superheated state having a superheat degree and a wet state containing wet vapor.

9. The refrigeration cycle device according to claim 8, further comprising
a pressure regulation valve disposed on a downstream side of the air-conditioning cooler in a refrigerant flow, and configured to maintain a refrigerant pressure on a refrigerant outlet side of the air-conditioning cooler higher than a refrigerant pressure on the refrigerant outlet side of the heat exchanger.

10. The refrigeration cycle device according to claim 8, wherein
the controller is configured to perform the fluctuation operation to have:
(i) a first state in which the throttle opening degree of the refrigerant decompression valve is reduced until the superheat degree of the refrigerant on the refrigerant outlet side of the heat exchanger reaches a threshold temperature;
(ii) a second state in which the throttle opening degree of the refrigerant decompression valve is increased until the throttle opening degree of the refrigerant decompression valve reaches a reference opening degree at which the refrigerant state becomes the wet state, in response to that the superheat degree of the refrigerant on the refrigerant outlet side of the heat exchanger reaches the threshold temperature in the first state; and
(iii) a third state in which the throttle opening degree of the refrigerant decompression valve is reduced again until the superheat degree of the refrigerant on the refrigerant outlet side of the heat exchanger reaches the threshold temperature, in response to that the throttle opening degree of the refrigerant decompression valve reaches the reference opening degree in the second state.

11. The refrigeration cycle device according to claim 8, wherein the controller is configured to perform the fluctuation operation to have:
(i) a first state in which the throttle opening degree of the refrigerant decompression valve is reduced until the throttle opening degree of the refrigerant decompression valve reaches a first reference opening degree at which the superheat degree of the refrigerant on the refrigerant outlet side of the heat exchanger becomes a value equal to or higher than a predetermined threshold temperature;
(ii) a second state in which the throttle opening degree of the refrigerant decompression valve is increased until the throttle opening degree of the refrigerant decompression valve reaches a second reference opening degree at which the refrigerant state becomes the wet state, in response to that the throttle opening degree of the refrigerant decompression valve reaches the first reference opening degree; and (iii) a third state in which the throttle opening degree of the refrigerant decompression valve is reduced again until the throttle opening degree of the refrigerant decompression valve reaches the first reference opening degree, in response to that the throttle opening degree of the refrigerant decompression valve reaches the second reference opening degree.

12. The refrigeration cycle device according to claim 8, wherein
the controller controls the refrigerant decompression valve to perform the fluctuation operation in which a variation in the throttle opening degree per unit time is greater when the throttle opening degree of the refrigerant decompression valve is increased, than that when the throttle opening degree of the refrigerant decompression valve is reduced.

13. The refrigeration cycle device according to claim 8, wherein
the refrigerant radiator includes a condensing portion in which the refrigerant is condensed, and a liquid receiving portion in which the refrigerant having passed through the condensing portion is cooled and condensed into a vapor-phase refrigerant and a liquid-phase refrigerant to store therein a surplus liquid-phase refrigerant in the cycle.

14. The refrigeration cycle device according to claim 13, wherein the refrigerant radiator further includes a subcooling portion that releases heat from the refrigerant having passed through the liquid receiving portion.

15. The refrigeration cycle device according to claim 8, wherein the heat exchanger exchanges heat between the refrigerant decompressed in the refrigerant decompression valve and a heat medium circulating in a heat medium circuit.

16. A refrigeration cycle device capable of performing a room interior heating in which ventilation air to be blown into a space to be air conditioned is heated, the refrigeration cycle device comprising:
a compressor configured to compress and discharge a refrigerant containing oil;
a refrigerant radiator configured to heat the ventilation air using the refrigerant discharged from the compressor as a heat source during the room interior heating;
a refrigerant decompression valve configured to decompress the refrigerant having passed through the refrigerant radiator;
an evaporator configured to evaporate the refrigerant and to function as a heat absorber during the room interior heating; and
a controller configured to control a throttle opening degree of the refrigerant decompression valve, wherein
the controller is configured to perform, at least during the room interior heating, a fluctuation operation in which the throttle opening degree of the refrigerant decompression valve is changed and a refrigerant state on a refrigerant outlet side of the evaporator is alternately changed to a superheated state having a superheat degree and a wet state containing wet vapor.

\* \* \* \* \*